US012644783B2

(12) United States Patent
Lilley et al.

(10) Patent No.: US 12,644,783 B2
(45) Date of Patent: Jun. 2, 2026

(54) DEVICES AND METHODS FOR ANALYSIS OF MECHANICAL AND THERMAL LOADING OF STRUCTURES, AND METHODS FOR IMPROVING DESIGN PROCESSES FOR COMPONENTS OF SUCH STRUCTURES

(71) Applicant: The Boeing Company, Arlington, VA (US)

(72) Inventors: Bryan W. Lilley, Austin, TX (US); Joseph D. Schaefer, Richmond Heights, MO (US); Keith G. Rackers, Florissant, MO (US); Paul B. Dufour, O'Fallon, MO (US); Matthew J. Molitor, O'Fallon, MO (US)

(73) Assignee: THE BOEING COMPANY, Arlington, VA (US)

( * ) Notice: Subject to any disclaimer, the term of this patent is extended or adjusted under 35 U.S.C. 154(b) by 459 days.

(21) Appl. No.: 18/302,892

(22) Filed: Apr. 19, 2023

(65) Prior Publication Data

US 2024/0353272 A1     Oct. 24, 2024

(51) Int. Cl.
G01L 1/06 (2006.01)
G01N 25/16 (2006.01)

(52) U.S. Cl.
CPC ................ G01L 1/06 (2013.01); G01N 25/16 (2013.01)

(58) Field of Classification Search
CPC .......... G01L 1/06; G01N 25/16; G01N 25/72; G01N 3/28; G01N 2203/022;
(Continued)

(56) References Cited

U.S. PATENT DOCUMENTS 3,760,052 A * 9/1973 Fukuma .................. D01D 5/30
                                                   264/171.23
4,748,854 A * 6/1988 Rao .......................... G01N 3/32
                                                   73/837
(Continued)

OTHER PUBLICATIONS

Grawe, M. et al., "Operation of the Instron Tensile Test Machine With an Existing Method of Bluehill 3 Software," Oct. 6, 2014, 5 pages.
(Continued)

*Primary Examiner* — Tran M. Tran
(74) *Attorney, Agent, or Firm* — MH2 Technology Law Group LLP

(57) ABSTRACT

A device for analysis of mechanical and thermal loading of structures can include: a first member comprising first material; a second member comprising second material; and a third member comprising the first material. The second member can be fastened at least partially between the first and third members. The device can be configured to mechanically load the first, second, and third members by applying equal and opposite force to protruding ends of the first, second, and third members. A device for analysis of mechanical and thermal loading of structures can include: a first member comprising first material; and a second member comprising second material. The first member can be fastened at least partially between portions of the second member. The device can be configured to mechanically load the first and second members by applying equal and opposite force to protruding ends of the first and second members.

20 Claims, 13 Drawing Sheets

(58) Field of Classification Search

CPC ... G01N 2203/0226; G01N 2203/0264; G01N 2203/0282; G01N 2203/0298; G01N 33/2028; G01N 2291/0231; G01N 2291/0258; G01N 2021/08472; G01M 5/0033; G01M 5/0016; G01M 5/0041; G01M 99/002; G01M 99/007

See application file for complete search history.

(56) References Cited

U.S. PATENT DOCUMENTS

| | | | | |
|---|---|---|---|---|
| 5,085,083 | A * | 2/1992 | Corr | G01N 3/02 |
| | | | | 73/760 |
| 5,297,441 | A * | 3/1994 | Smith | G01N 3/04 |
| | | | | 73/818 |
| 5,566,570 | A * | 10/1996 | Hankel | G01N 33/346 |
| | | | | 73/849 |
| 5,795,641 | A * | 8/1998 | Pauley | B29C 44/22 |
| | | | | 428/137 |
| 6,615,671 | B1 * | 9/2003 | Carstensen | G01N 3/32 |
| | | | | 73/808 |
| 6,844,283 | B2 * | 1/2005 | Suzuki | H01L 23/15 |
| | | | | 423/594.12 |
| 7,387,753 | B2 * | 6/2008 | Tackett | G01N 3/08 |
| | | | | 264/161 |
| 7,743,665 | B2 * | 6/2010 | Withey | G01N 3/62 |
| | | | | 73/856 |
| 8,287,681 | B2 * | 10/2012 | Girshovich | G01N 29/30 |
| | | | | 156/252 |
| 8,436,311 | B2 * | 5/2013 | Shelley | G01N 21/8422 |
| | | | | 250/341.1 |
| 9,347,868 | B2 * | 5/2016 | Van Voast | G01N 19/04 |
| 9,679,856 | B2 * | 6/2017 | Glacer | B81C 99/004 |
| 9,945,835 | B2 * | 4/2018 | Shih | A61B 5/444 |
| 10,060,902 | B2 * | 8/2018 | Patmore | G01N 27/12 |
| 10,139,337 | B2 * | 11/2018 | Greegor | B06B 3/00 |
| 10,401,268 | B2 * | 9/2019 | Kuehlewind | G01M 15/14 |
| 10,408,723 | B2 * | 9/2019 | Krasnowski | G01N 3/20 |
| 10,571,438 | B2 * | 2/2020 | Berenbaum | G01M 5/0016 |
| 10,845,282 | B2 * | 11/2020 | Dilligan | B32B 7/14 |
| 11,119,000 | B2 * | 9/2021 | Penn | G01M 5/0016 |
| 11,181,360 | B2 * | 11/2021 | Saito | G01B 11/18 |
| 11,209,369 | B2 * | 12/2021 | Wilson | G01L 1/24 |
| 11,307,029 | B2 * | 4/2022 | Moore | G06F 30/17 |
| 11,486,805 | B2 * | 11/2022 | Hu | G01N 3/30 |
| 11,725,994 | B2 * | 8/2023 | Ryu | H10K 50/182 |
| | | | | 356/32 |
| 11,850,808 | B2 * | 12/2023 | Zivkovic | B29C 70/302 |
| 11,890,852 | B2 * | 2/2024 | Gurvich | B32B 27/12 |
| 12,053,968 | B2 * | 8/2024 | Yamada | B32B 27/12 |
| 12,266,494 | B2 * | 4/2025 | Heremans | H01H 61/01 |
| 2008/0195357 | A1 * | 8/2008 | Gustafson | G06F 30/23 |
| | | | | 703/1 |
| 2014/0336954 | A1 * | 11/2014 | Bruyneel | G01M 5/00 |
| | | | | 702/34 |
| 2016/0169783 | A1 * | 6/2016 | Levasseur | G06K 19/07749 |
| | | | | 73/826 |
| 2020/0072719 | A1 * | 3/2020 | Shimada | G01N 3/00 |
| 2022/0134727 | A1 * | 5/2022 | Shimokawa | B44C 1/172 |
| | | | | 428/32.6 |
| 2024/0248053 | A1 * | 7/2024 | Kanbe | G01N 25/16 |

OTHER PUBLICATIONS

Instron, "High Force Universal Testing Machines," Product Brochure, 2020, 24 pages.

* cited by examiner

DEVICES AND METHODS FOR ANALYSIS
OF MECHANICAL AND THERMAL
LOADING OF STRUCTURES, AND
METHODS FOR IMPROVING DESIGN
PROCESSES FOR COMPONENTS OF SUCH
STRUCTURES

FIELD

The subject matter disclosed herein generally relates to
devices for analysis of combined mechanical and thermal
loading of structures. The subject matter disclosed herein
also generally relates to methods for analysis of combined
mechanical and thermal loading of structures. Additionally,
the subject matter disclosed herein also generally relates to
methods for improving design processes for components
subjected to combined mechanical and thermal loading.

BACKGROUND

In many industries, such as the aviation industry, signifi-
cant reliance is placed on predicting combined mechanical
and thermal loading of structures, calculating mechanical
and thermal loading of structures, and on analysis of com-
bined mechanical and thermal loading of structures. As a
result, there exists a need to develop devices for analysis of
such combined mechanical and thermal loading of struc-
tures. Such devices can be used in various methods for
analysis of combined mechanical and thermal loading of
structures. And such methods can be used in improving
design processes for components that comprise those mate-
rials and other materials with similar physical properties.

Some aerospace design approaches/methods for predict-
ing combined mechanical and thermal loading generate
overly conservative results (e.g., predict failure loads much
lower than the observed experimental failure loads). One
particular method that sometimes suffers from this excessive
conservatism is linear elastic Finite Element Analysis
("FEA"). The reason that linear elastic FEA will sometimes
significantly underpredict the failure load is that the
neglected plastic deformation and joint compliance in the
structure (e.g., due to gaps between components) will relieve
thermal-expansion-induced motion, thereby reducing the
load. Although linear elastic FEA has shortcomings, it is
used extensively in the aviation industry for full-vehicle
analysis because alternate more exact analyses require sig-
nificantly more labor, computational resources, and time.

When fastened joints/members of dissimilar materials
(e.g., metallics and composite laminates) are heated and/or
cooled, high thermally induced stresses result because the
materials, which would expand and/or contract different
amounts in the unrestrained state, are constrained to deflect
the same amount by the presence of the joint. Therefore, the
material that would expand less in the unrestrained state is
stretched and the material that would expand more in the
unrestrained state is compressed due to the different coef-
ficients of thermal expansion between the materials within a
same structural joint. Furthermore, the fasteners that join the
dissimilar materials are subjected to high loads because they
impose this constraint on the members.

Because of the issues discussed above, there is a need in
many industries, such as the aerospace, automotive, defense,
electronics, maritime, and rail-transport industries, for
developing devices for analysis of combined mechanical and
thermal loading of structures, for developing methods for
analysis of combined mechanical and thermal loading of structures, and for improving design processes for compo-
nents that comprise those materials and other materials with
similar physical properties.

SUMMARY

The present disclosure is directed to devices for analysis
of combined mechanical and thermal loading of structures,
methods for analysis of combined mechanical and thermal
loading of structures, and/or methods for improving design
processes for components subject to this loading.

In some examples, a device for analysis of mechanical
and thermal loading of structures can comprise: a first
member comprising first material; a second member com-
prising second material; and a third member comprising the
first material. The second member can be at least partially
between the first and third members. The second member
can be fastened to the first and third members (e.g., in at least
two locations along the length of the second member). The
first material can differ from the second material. The device
can be configured to mechanically load the first, second, and
third members by applying equal and opposite force to
protruding ends of the first, second, and third members (e.g.,
a force can be applied to the ends of the first and third
members that extend beyond the second member and, at the
same time, an equal and opposite force can be applied to the
end of the second member that extends beyond the first and
third members).

In some examples of the device, the first material can have
a first coefficient of thermal expansion. The second material
can have a second coefficient of thermal expansion. The first
coefficient of thermal expansion can differ from the second
coefficient of thermal expansion.

In some examples of the device, the first coefficient of
thermal expansion can be greater than the second coefficient
of thermal expansion.

In some examples of the device, the first coefficient of
thermal expansion can be less than the second coefficient of
thermal expansion.

In some examples of the device, the first material can
comprise at least one metal.

In some examples of the device, the first material can
comprise at least one non-metal.

In some examples of the device, the first material can
comprise a composite laminate.

In some examples of the device, the second material can
comprise at least one metal.

In some examples of the device, the second material can
comprise at least one non-metal.

In some examples of the device, the second material can
comprise at least one composite laminate.

In some examples, a device for analysis of mechanical
and thermal loading of structures can comprise: a first
member comprising first material; and a second member
comprising second material. The first member can be at least
partially between portions of the second member. The first
member can be fastened to the second member (e.g., in at
least two locations along the length of the second member).
The first material can differ from the second material. The
device can be configured to mechanically load the first and
second members by applying equal and opposite force to
protruding ends of the first and second members (e.g., a
force can be applied to the end of the first members that
extends beyond the second member and, at the same time, an
equal and opposite force can be applied to the end of the
second member that extends beyond the first member).

In some examples of the device, the first material can have a first coefficient of thermal expansion. The second material can have a second coefficient of thermal expansion. The first coefficient of thermal expansion can differ from the second coefficient of thermal expansion.

In some examples of the device, the first coefficient of thermal expansion can be greater than the second coefficient of thermal expansion.

In some examples of the device, the first coefficient of thermal expansion can be less than the second coefficient of thermal expansion.

In some examples, a method for analysis of mechanical and thermal loading of structures can comprise: selecting first, second, and third members; fastening the second member to the first and third members to form a device for the analysis (e.g., in at least two locations along the length of the second member), wherein the second member is at least partially between the first and third members; thermally loading the device by raising or lowering a temperature of the first, second, and third members; mechanically loading the device by applying equal and opposite force to protruding ends of the first, second, and third members (e.g., a force can be applied to the ends of the first and third members that extend beyond the second member and, at the same time, an equal and opposite force can be applied to the end of the second member that extends beyond the first and third members) until failure of a member or fastener occurs; and measuring a failure load or other relevant physical parameter of the device. The first member can comprise first material. The second member can comprise second material. The third member can comprise the first material.

In some examples of the method, the method can further comprise: determining one or more corrections for a thermal loading analysis based on the measured failure load or other relevant physical parameter of the device.

In some examples of the method, the method can further comprise: determining one or more corrections for a combined mechanical and thermal loading analysis based on the measured failure load or other relevant physical parameter of the device.

In some examples of the method, the first material can have a first coefficient of thermal expansion. The second material can have a second coefficient of thermal expansion. The first coefficient of thermal expansion can differ from the second coefficient of thermal expansion.

In some examples of the method, the first coefficient of thermal expansion can be greater than the second coefficient of thermal expansion.

In some examples of the method, the first coefficient of thermal expansion can be less than the second coefficient of thermal expansion.

In some examples of the method, the method can further comprise: fastening the first and third members to the second member (e.g., in at least two locations along the length of the second member) without generating axial load; and mechanically loading the first, second, and third members by applying equal and opposite force to protruding ends of the first, second, and third members (e.g., a force can be applied to the ends of the first and third members that extend beyond the second member and, at the same time, an equal and opposite force can be applied to the end of the second member that extends beyond the first and third members) until failure of a member or fastener occurs. This method should establish the failure load for mechanical-only loading.

In some examples of the method, the method can further comprise: raising or lowering the temperature of the first, second, and third members; fastening the first and third members to the second member (e.g., in at least two locations along the length of the second member) without generating axial load; and mechanically loading the first, second, and third members by applying equal and opposite force to protruding ends of the first, second, and third members (e.g., a force can be applied to the ends of the first and third members that extend beyond the second member and, at the same time, an equal and opposite force can be applied to the end of the second member that extends beyond the first and third members) until failure of a member or fastener occurs. This method should establish the failure load for mechanical-only loading.

In some examples of the method, the method can further comprise: determining corrections for simplified analyses based on a comparison between the measured and predicted failure loads for the tests subjected to combined thermal and mechanical loading and the tests subjected to only mechanical loading.

In some examples, a method for analysis of mechanical and thermal loading of structures and for determining corrections to simplified analyses can be accomplished for a two-member system in a manner analogous to the three-member system described above, where the first and third member have been combined into the first member.

In some examples, a device for analysis of mechanical and thermal loading of structures can comprise: a first member comprising first material; a second member comprising second material; and a third member comprising the first material. The second member can be at least partially between the first and third members. The second member can be fastened to the first and third members. The first material can differ from the second material. The device can be configured to mechanically load the first, second, and third members by applying equal and opposite force to protruding ends of the second member.

In some examples of the device, the first material can have a first coefficient of thermal expansion. The second material can have a second coefficient of thermal expansion. The first coefficient of thermal expansion can differ from the second coefficient of thermal expansion.

In some examples of the device, the first coefficient of thermal expansion can be greater than the second coefficient of thermal expansion.

In some examples of the device, the first coefficient of thermal expansion can be less than the second coefficient of thermal expansion.

It is to be understood that both the foregoing general description and the following detailed description are exemplary and explanatory only, and are not restrictive of the present teachings, as claimed.

DRAWINGS

The above and/or other aspects and advantages will become more apparent and more readily appreciated from the following detailed description of examples, taken in conjunction with the accompanying drawings, in which.

DETAILED DESCRIPTION

Figure 1A:
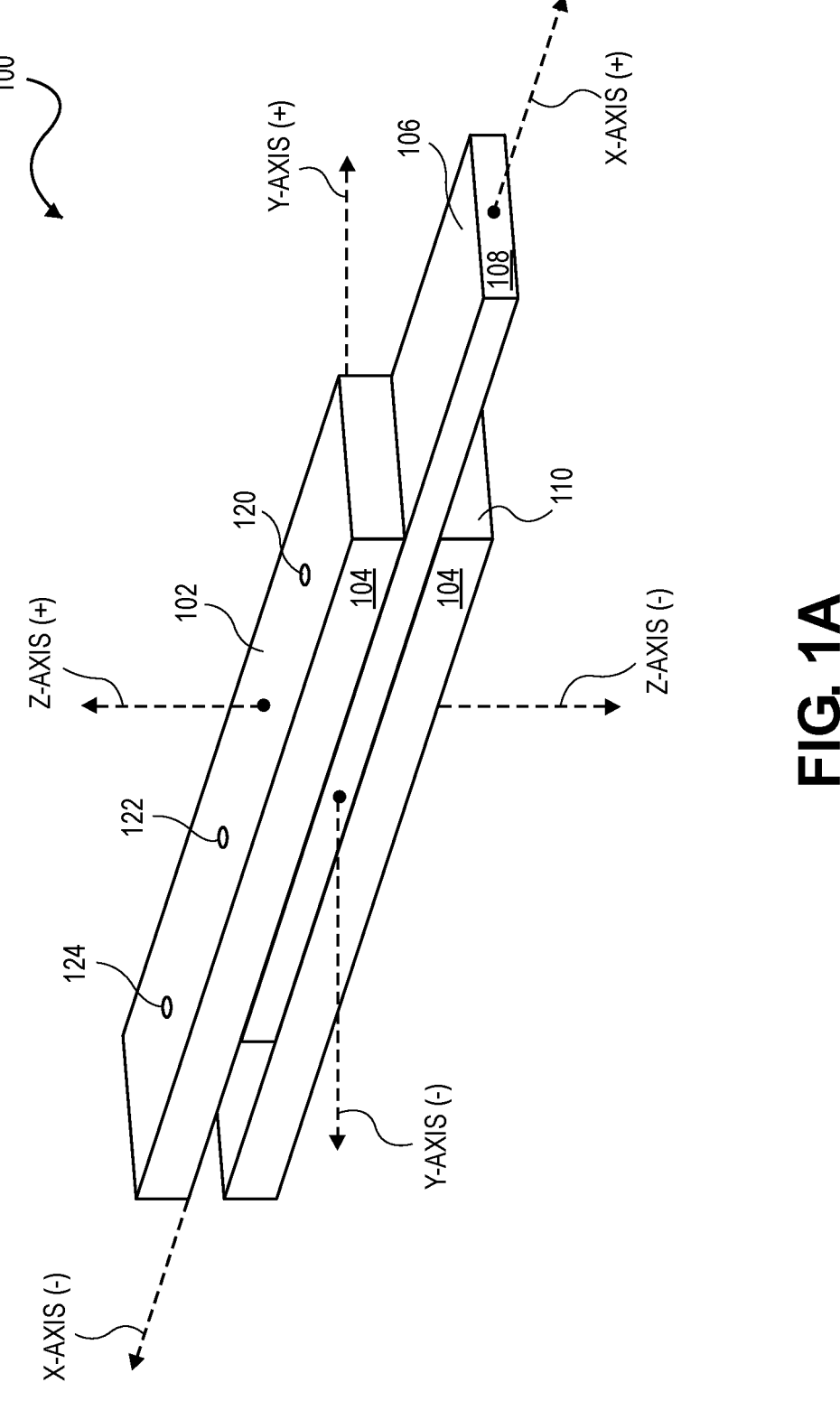
FIG. 1A shows a device for analysis of combined mechanical and thermal loading of structures according to some examples of the disclosed apparatuses.

Exemplary aspects will now be described more fully with reference to the accompanying drawings. Examples of the disclosure, however, can be embodied in many different forms and should not be construed as being limited to the examples set forth herein. Rather, these examples are provided so that this disclosure will be thorough and complete, and will fully convey the scope to a person having ordinary skill in the art ("PHOSITA"). In the drawings, some details may be simplified and/or may be drawn to facilitate understanding rather than to maintain strict structural accuracy, detail, and/or scale. For example, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, or section could be termed a second element, component, region, layer, or section without departing from the teachings of examples.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation(s) depicted in the figures.

The terminology used herein is for the purpose of describing particular examples only and is not intended to be limiting of examples. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as understood by a PHOSITA. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The present disclosure is generally directed to devices for analysis of combined mechanical and thermal loading of structures. The present disclosure also is generally directed to methods for analysis of combined mechanical and thermal loading of structures. Additionally, the present disclosure is generally directed to methods for improving design processes for components subject to such loading.

FIGS. 1A-1D show device 100 for analysis of combined mechanical and thermal loading of structures, according to some examples of the disclosed apparatuses.

As shown in FIGS. 1A-1D, device 100 for analysis of combined mechanical and thermal loading of structures can comprise: first member 102 comprising first material 104; second member 106 comprising second material 108; and third member 110 comprising first material 104. First material 104 can differ from second material 108.

Second member 106 can be at least partially between first member 102 and third member 110. Second member 106 can be attached to first member 102 and third member 110 in at least two locations along the length of second member 106 using, for example, fasteners (not shown) commonly employed in the aviation industry (e.g., aerospace fasteners, bolts, or rivets).

Device 100 can be configured to mechanically load first member 102, second member 106, and third member 110 by applying force to the ends of first member 102 and third member 110 that extend beyond second member 106 and, at the same time, by applying equal and opposite force to the end of second member 106 that extends beyond first member 102 and third member 110. For example, such forces can be applied to first member 102 and third member 110, while holding second member 106, using a universal testing machine, as discussed below.

First material 104 can comprise at least one metal, such as aluminum or aluminum alloy, nickel or nickel alloy, niobium or niobium alloy, magnesium or magnesium alloy, steel or steel alloy, titanium or titanium alloy, tungsten or tungsten alloy, or vanadium or vanadium alloy. As would be understood by a PHOSITA, selection of materials for first material 104 can be tailored to produce various coefficients of thermal expansion for thermal loading.

In addition or in the alternative, first material 104 can comprise an additively manufactured metal part. First material 104 can comprise at least one non-metal, at least one polymer, or a composite laminate. In addition or in the alternative, first material 104 can comprise an additively manufactured polymer part.

Such a composite laminate of first material 104 can comprise reinforcing fibers, such as carbon fibers, glass fibers, or carbon fibers and glass fibers. Such fibers may have no specific orientation (e.g., omnidirectional) or may be oriented in one or more directions (e.g., unidirectional, bidirectional, or multidirectional). The fibers may be aligned, continuous, discontinuous, and/or unidirectional.

The composite laminate can comprise, for example, continuous fibers, short fibers, pre-preg unidirectional tape, pre-preg fabric, a combination of pre-preg tape and fabric layers to create a hybrid laminate, or fabric or unidirectional fibers infused by resin and cured into a laminate. As would be understood by a PHOSITA, selection of materials and/or orientation of layers within such a composite laminate of first material 104 can be tailored to produce various coefficients of thermal expansion for thermal loading.

Second material 108 can comprise at least one metal, such as aluminum or aluminum alloy, nickel or nickel alloy, niobium or niobium alloy, magnesium or magnesium alloy, steel or steel alloy, titanium or titanium alloy, tungsten or tungsten alloy, or vanadium or vanadium alloy. As would be understood by a PHOSITA, selection of materials for second material 108 can be tailored to produce various coefficients of thermal expansion for thermal loading.

In addition or in the alternative, second material 108 can comprise an additively manufactured metal part. Second material 108 can comprise at least one non-metal, at least one polymer, or a composite laminate. In addition or in the alternative, second material 108 can comprise an additively manufactured polymer part.

Such a composite laminate of second material 108 can comprise reinforcing fibers, such as carbon fibers, glass fibers, or carbon fibers and glass fibers. Such fibers may have no specific orientation (e.g., omnidirectional) or may be oriented in one or more directions (e.g., unidirectional, bidirectional, or multidirectional). The fibers may be aligned, continuous, discontinuous, and/or unidirectional.

The composite laminate can comprise, for example, continuous fibers, short fibers, pre-preg unidirectional tape, pre-preg fabric, a combination of pre-preg tape and fabric layers to create a hybrid laminate, or fabric or unidirectional fibers infused by resin and cured into a laminate. As would be understood by a PHOSITA, selection of materials and/or orientation of layers within such a composite laminate of second material 108 can be tailored to produce various coefficients of thermal expansion for thermal loading.

In a first example, first material 104 can comprise at least one metal, such as aluminum or aluminum alloy, and second material 108 can comprise a composite laminate comprising carbon fibers. In a second example, first material 104 can comprise a composite laminate comprising glass fibers, and second material 108 can comprise at least one metal, such as titanium or titanium alloy.

Because first member 102 and third member 110 comprise first material 104, first member 102 and third member 110 have a first coefficient of thermal expansion. Because second member 106 comprises second material 108, second member 106 has a second coefficient of thermal expansion.

For analysis of combined mechanical and thermal loading of structures, it is desired that the first coefficient of thermal expansion differ from the second coefficient of thermal expansion. Under some testing conditions, the first coefficient of thermal expansion can be greater than the second coefficient of thermal expansion, while under other testing conditions, the first coefficient of thermal expansion can be less than the second coefficient of thermal expansion.

Figure 1B:
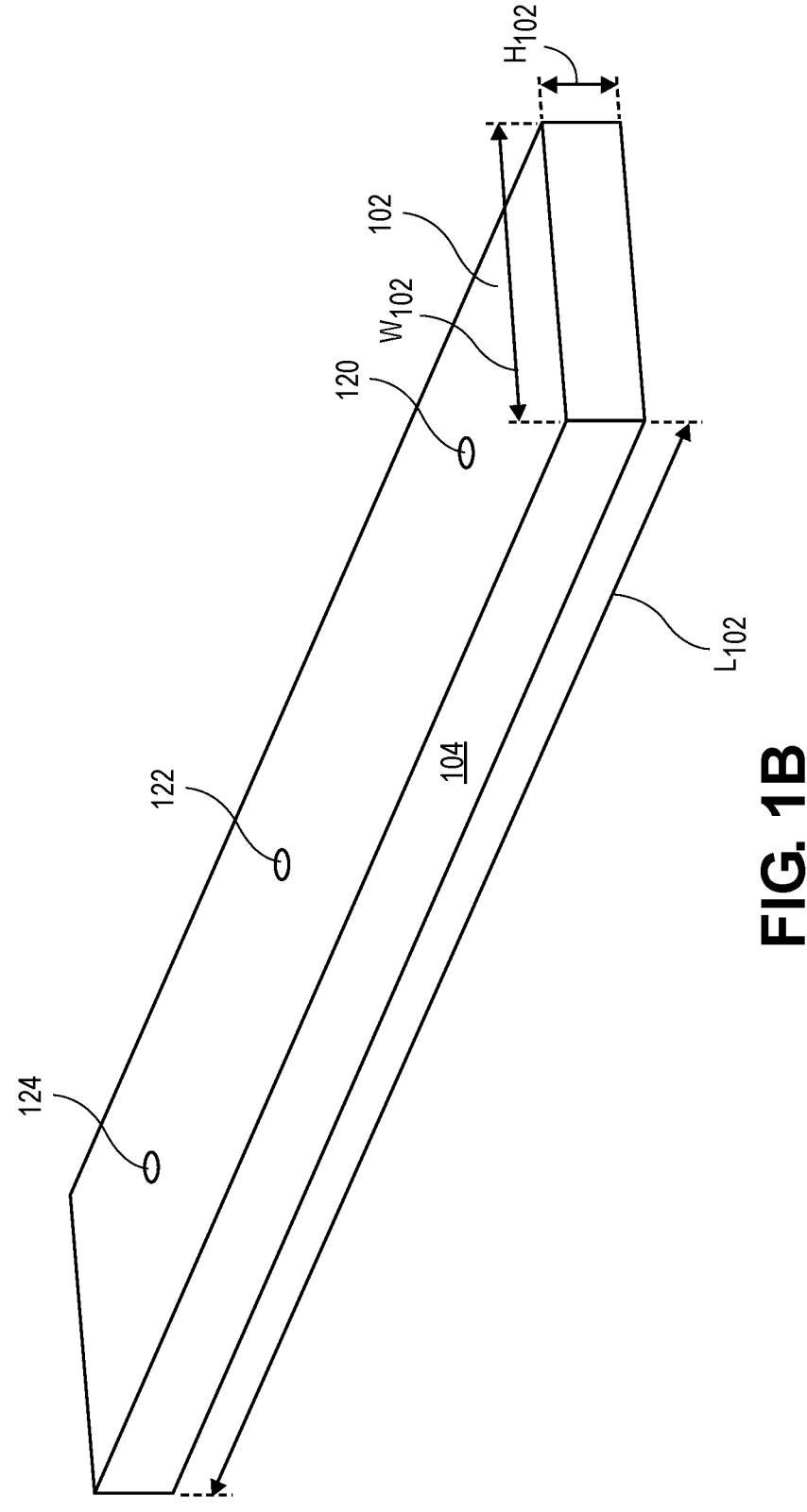
FIG. 1B shows a first member of the device of FIG. 1A.
Figure 1C:
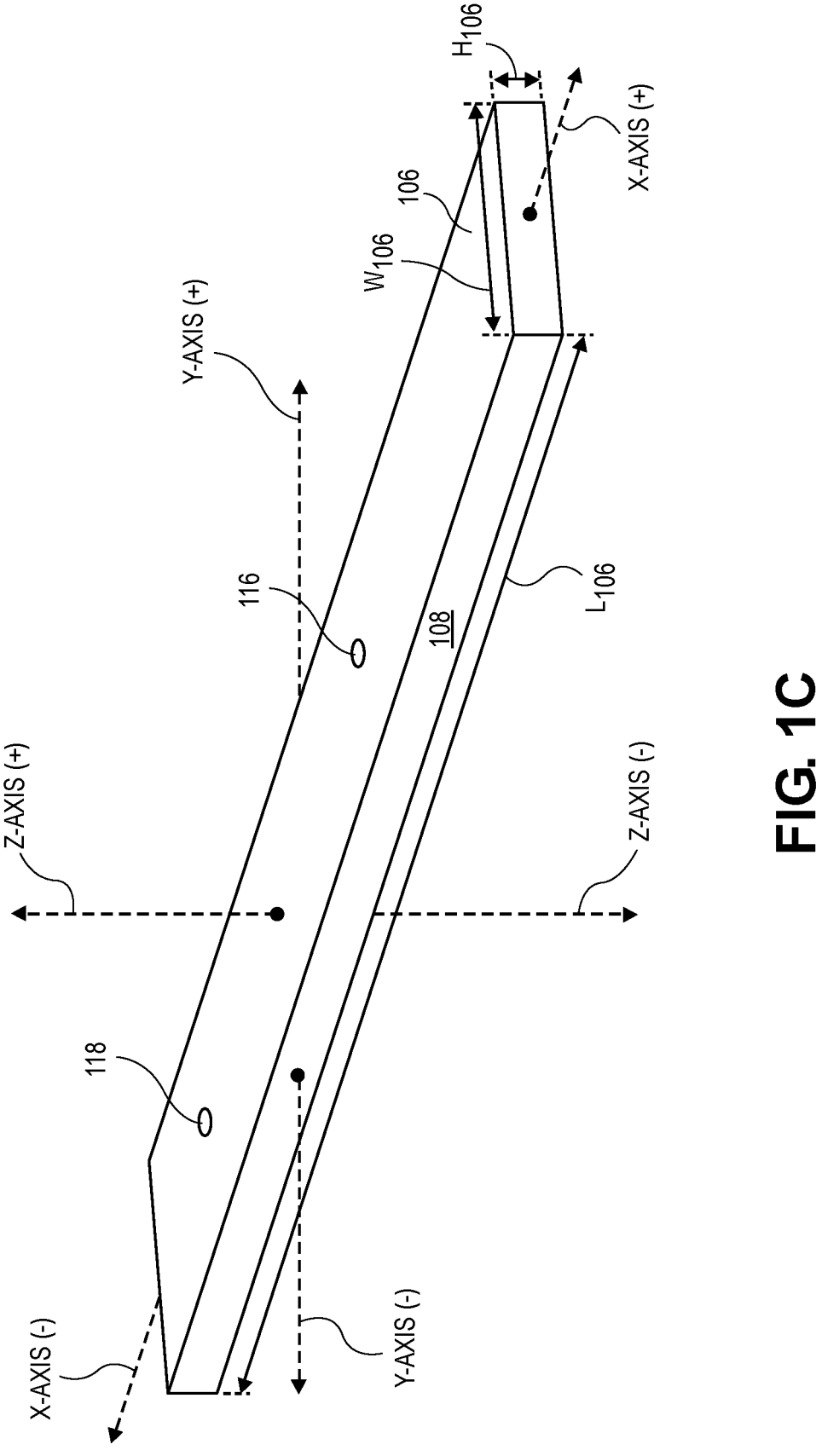
FIG. 1C shows a second member of the device of FIG. 1A.

As shown in FIGS. 1A and 1C, in order to simplify calculations, estimates, measurements, and other issues associated with analysis of combined mechanical and thermal loading of structures, second member 106 can comprise a substantially flat, rectangular plate having length $L_{106}$, width $W_{106}$, and height $H_{106}$. Example values include: length $L_{106}$ (e.g., 5"-100", 7.5"-50", or 10"-25"-such as 6.5", 9.5", 10", 11.5", 13.5", 14.5", 15", 18.5", 20", 23.5", or 24.5"); width $W_{106}$ (e.g., 1"-10", 1.5"-5", or 2"-4"-such as 1.5", 2", 2.5", or 3"); and height $H_{106}$ (e.g., 0.05"-0.60", 0.06"-0.30", or 0.075"-0.15"-such as 0.08", 0.09", 0.10", or 0.135").

Although other shapes could be used for second member 106, such as a plate with a circular, triangular, pentagonal, hexagonal, or other cross section (rather than a rectangular cross section) or a plate whose overall shape resembles a circle, ellipse, oval, parallelogram, rhombus, trapezoid, or other figure (rather than a rectangle), a PHOSITA would recognize that such alternate cross sections and/or overall shapes could add complexity to the calculations, estimates, measurements, and other issues associated with the analysis of combined mechanical and thermal loading of structures.

As also shown in FIGS. 1A and 1C, second member 106 can define a three-dimensional ("3D") coordinate-axis system for device 100 that includes an X-axis along length $L_{106}$, a Y-axis along width $W_{106}$, and a Z-axis along height $H_{106}$ in which the positive directions for the axes follow the right-hand rule. When second member 106 is a substantially flat, rectangular, homogeneous plate, the center of mass of second member 106 should lie on the X-axis.

In order to facilitate fastening second member 106 to first member 102 and third member 110, second member 106 can include through holes 116 and 118. Through holes 116 and 118 should lie along the X-axis and the direction of through holes 116 and 118 should be parallel to the Z-axis. Although a PHOSITA would recognize that other approaches for fastening second member 106 to first member 102 and third member 110 can be used, through holes that are aligned and penetrate first member 102, second member 106, and third member 110 provide an approach that is simple, efficient, effective, and should provide repeatable testing results.

In order to simplify calculations, estimates, measurements, and other issues associated with analysis of combined mechanical and thermal loading of structures, when second member 106 is mechanically loaded by first member 102 and third member 110, the mechanical load on second member 106 from first member 102 should be equal to the mechanical load on second member 106 from third member 110, so that the net mechanical load is applied along the X-axis. Because of this net mechanical loading along the X-axis, second member 106 should not have a tendency to bend, curl, or twist, and should not have a tendency to move along the Y-axis, to move along the Z-axis, to roll with respect to the X-axis, to pitch with respect to the Y-axis, or to yaw with respect to the Z-axis.

As shown in FIGS. 1A and 1B, in order to simplify calculations, estimates, measurements, and other issues associated with analysis of combined mechanical and thermal loading of structures, first member 102 can comprise a substantially flat, rectangular plate having length $L_{102}$, width $W_{102}$, and height $H_{102}$. First member 102 can be, for example, thickened at one end for increased strength. Example values include: length $L_{102}$ (e.g., 5"-100", 7.5"-50", or 10"-25"-such as 6.5", 9.5", 10", 11.5", 13.5", 14.5", 15", 18.5", 20", 23.5", or 24.5"); width $W_{102}$ (e.g., 1"-10", 1.5"-5", or 2"-4"-such as 1.5", 2", 2.5", or 3"); and height $H_{102}$ (e.g., 0.05"-0.60", 0.06"-0.30", or 0.075"-0.15"-such as 0.08", 0.09", 0.10", or 0.135").

Although other shapes could be used for first member 102, such as a plate with a circular, triangular, pentagonal, hexagonal, or other cross section (rather than a rectangular cross section) or a plate whose overall shape resembles a circle, ellipse, oval, parallelogram, rhombus, trapezoid, or other figure (rather than a rectangle), a PHOSITA would recognize that such alternate cross sections and/or overall shapes could add complexity to the calculations, estimates, measurements, and other issues associated with the analysis of combined mechanical and thermal loading of structures.

As shown in FIG. 1A, when assembling device 100, first member 102 can be substantially aligned with second member 106 along the X-axis.

In order to facilitate fastening second member 106 to first member 102, first member 102 can include through holes 120 and 122. When assembling device 100, through holes 120 and 122 should lie along the X-axis and the direction of through holes 120 and 122 should be parallel to the Z-axis. Although a PHOSITA would recognize that other approaches for fastening second member 106 to first member 102 can be used, through holes that are aligned and penetrate first member 102, second member 106, and third member 110 provide an approach that is simple, efficient, effective, and should provide repeatable testing results.

Figure 1D:
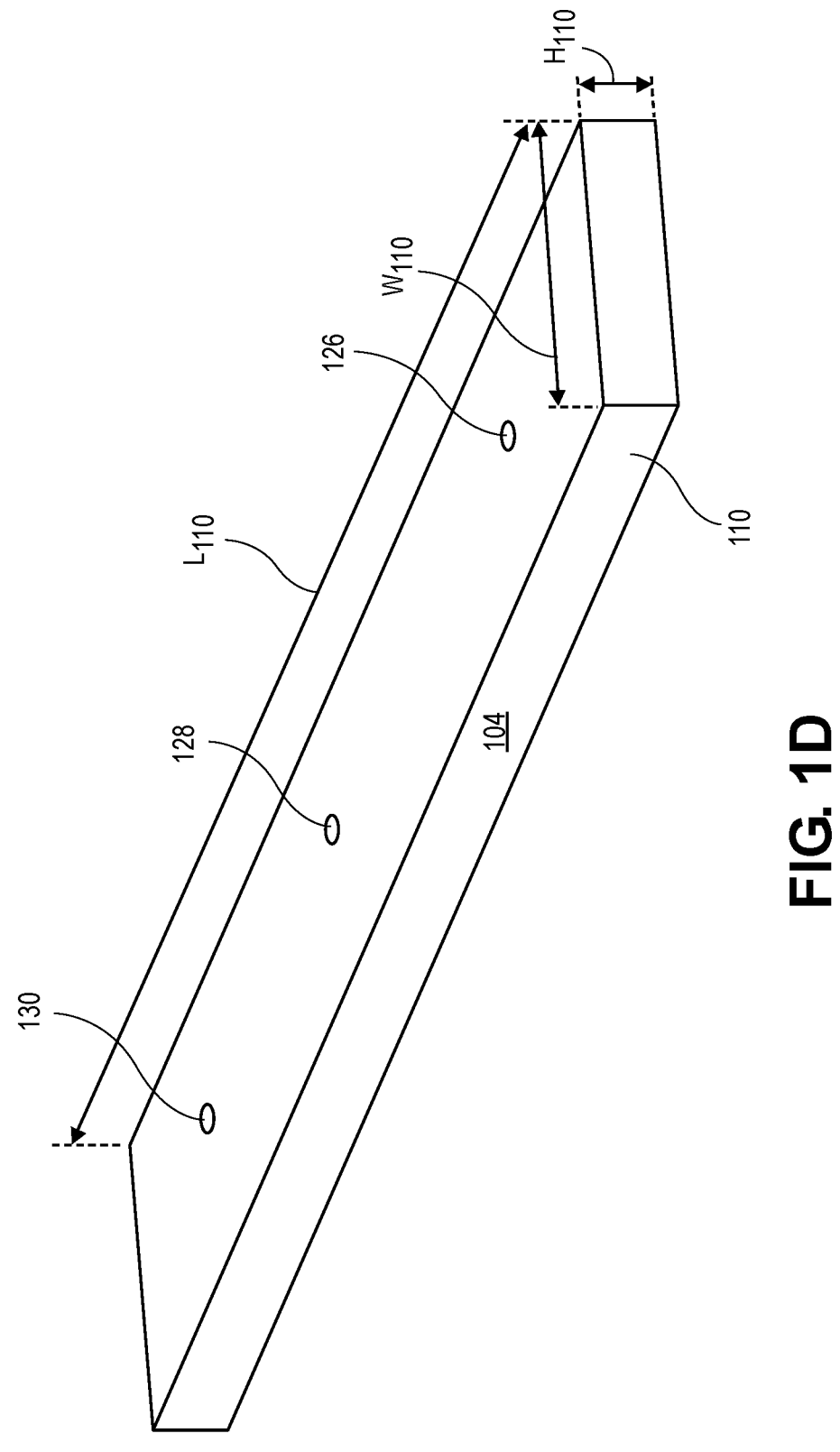
FIG. 1D shows a third member of the device of FIG. 1A.

As shown in FIGS. 1A and 1D, in order to simplify calculations, estimates, measurements, and other issues associated with analysis of combined mechanical and thermal loading of structures, third member 110 can comprise a substantially flat, rectangular plate having length $L_{110}$, width $W_{110}$, and height $H_{110}$. Third member 110 can be, for example, thickened at one end for increased strength. Example values include: length $L_{110}$ (e.g., 5"-100", 7.5"-50", or 10"-25"-such as 6.5", 9.5", 10", 11.5", 13.5", 14.5", 15", 18.5", 20", 23.5", or 24.5"); width $W_{110}$ (e.g., 1"-10", 1.5"-5", or 2"-4"-such as 1.5", 2", 2.5", or 3"); and height $H_{110}$ (e.g., 0.05"-0.60", 0.06"-0.30", or 0.075"-0.15"-such as 0.08", 0.09", 0.10", or 0.135").

Although other shapes could be used for third member 110, such as a plate with a circular, triangular, pentagonal, hexagonal, or other cross section (rather than a rectangular cross section) or a plate whose overall shape resembles a circle, ellipse, oval, parallelogram, rhombus, trapezoid, or other figure (rather than a rectangle), a PHOSITA would recognize that such alternate cross sections and/or overall shapes could add complexity to the calculations, estimates, measurements, and other issues associated with the analysis of combined mechanical and thermal loading of structures.

As shown in FIG. 1A, when assembling device 100, third member 110 can be substantially aligned with second member 106 along the X-axis.

In order to facilitate fastening second member 106 to third member 110, third member 110 can include through holes 126 and 128. When assembling device 100, through holes 126 and 128 should lie along the X-axis and the direction of through holes 126 and 128 should be parallel to the Z-axis. Although a PHOSITA would recognize that other approaches for fastening second member 106 to third member 110 can be used, through holes that are aligned and penetrate first member 102, second member 106, and third member 110 provide an approach that is simple, efficient, effective, and should provide repeatable testing results.

In order to simplify calculations, estimates, measurements, and other issues associated with analysis of combined mechanical and thermal loading of structures, when load is applied to first member 102 at through hole 124 and to third member 110 at through hole 130 (both as discussed below), while simultaneously holding the opposite end of second member 106, the mechanical load on first member 102 should be equal to the mechanical load on third member 110, so that the net mechanical load is applied along the X-axis. Because of this net mechanical loading along the X-axis and the presence of second member 106, third member 110 should not have a tendency to bend, curl, or twist, and should not have a tendency to move along the Y-axis, to move along the Z-axis, to roll with respect to the X-axis, to pitch with respect to the Y-axis, or to yaw with respect to the Z-axis.

When first member 102 and third member 110 are mechanically loaded while holding second member 106, a distance in the X-axis direction between fasteners joining first member 102 and third member 110 to second member 106 can increase.

Device 100 can be configured to apply force to first member 102 at through hole 124 (e.g., the protruding end of first member 102) and to third member 110 at through hole 130 (e.g., the protruding end of third member 110) while holding the opposite end of second member 106 (e.g., the protruding end of second member 106). A first load path is through first member 102, between through hole 124 and through hole 122, through a fastener in through hole 122 in first member 102 and through hole 118 in second member 106, and through second member 106 between through hole 118 and the protruding end of second member 106. A second load path is through first member 102 between through hole 124 and through hole 120, through a fastener in through hole 120 in first member 102 and through hole 116 in second member 106, and through second member 106 between through hole 116 and the protruding end of second member 106. A third load path is through third member 110, between through hole 130 and through hole 128, through a fastener in through hole 128 in third member 110 and through hole 118 in second member 106, and through second member 106 between through hole 118 and the protruding end of second member 106. A fourth load path is through third member 110 between through hole 130 and through hole 126, through a fastener in through hole 126 in third member 110 and through hole 116 in second member 106, and through second member 106 between through hole 116 and the protruding end of second member 106.

As discussed above, first member 102 can comprise a first plate, second member 106 can comprise a second plate, and third member 110 can comprise a third plate. One or more plates of the first, second, and third plates can comprise a substantially flat, rectangular plate. As discussed above, a PHOSITA would recognize that alternate cross sections and/or overall shapes, although useable, could add complexity to the calculations, estimates, measurements, and other issues associated with the analysis of combined mechanical and thermal loading of structures.

The first and third plates can lie in parallel geometric planes. The first, second, and third plates can lie in parallel geometric planes. As used herein, the term "geometric plane" is intended to distinguish the word "plane" as used in the field of geometry from the word "plane" as used in the aviation industry.

Figure 2A:
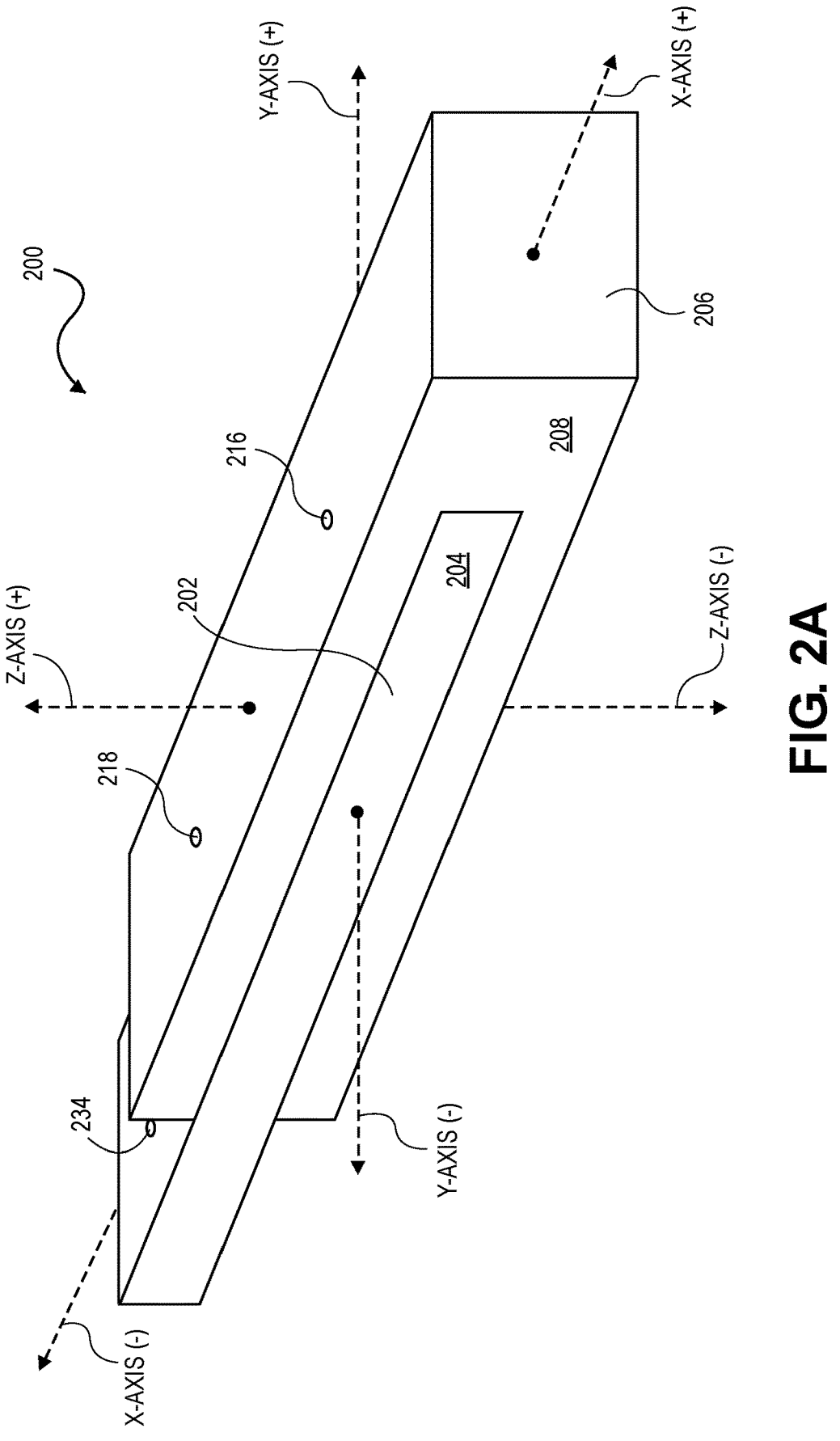
FIG. 2A shows a device for analysis of combined mechanical and thermal loading of structures according to some examples of the disclosed apparatuses.
Figure 2B:
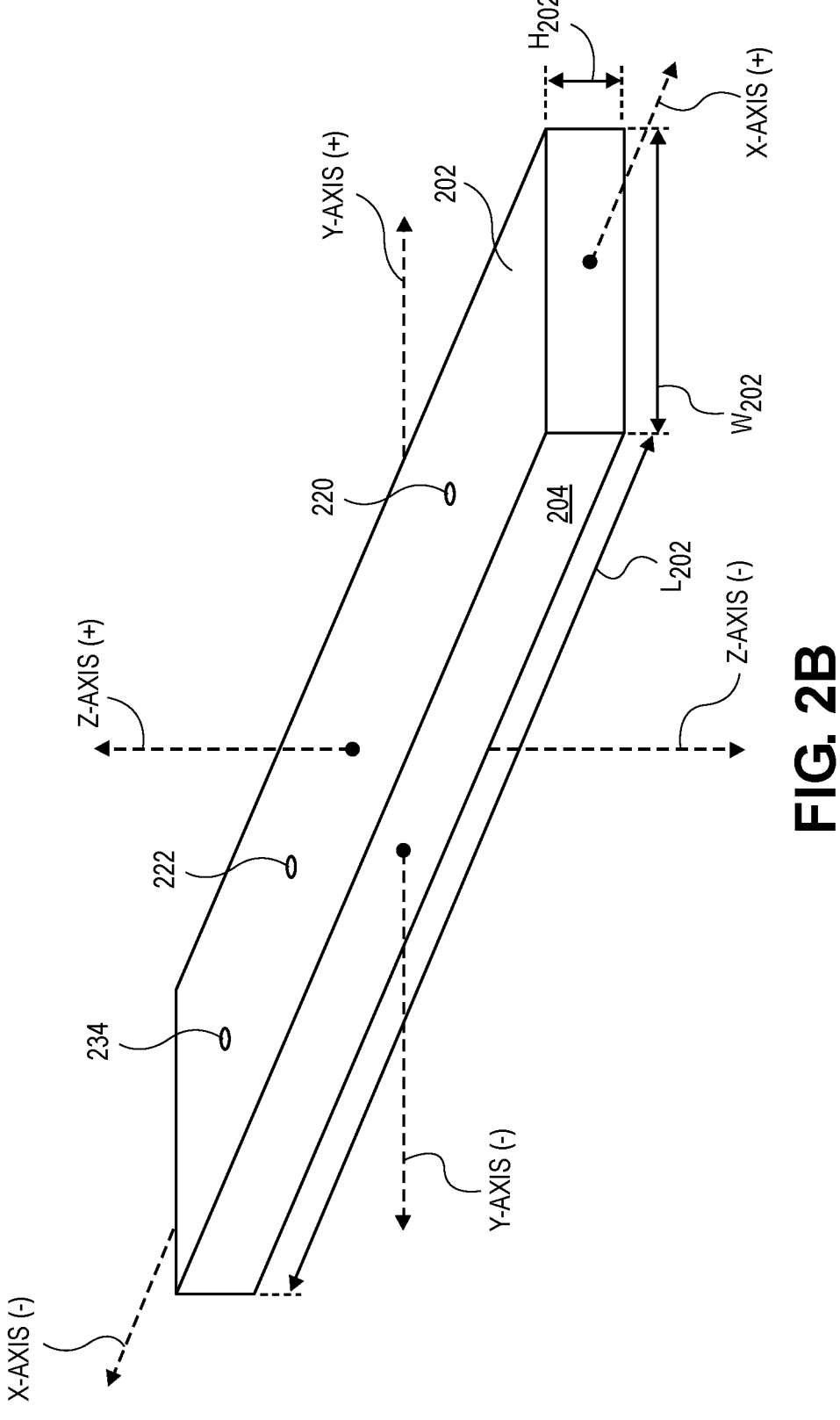
FIG. 2B shows a first member of the device of FIG. 2A.
Figure 2C:
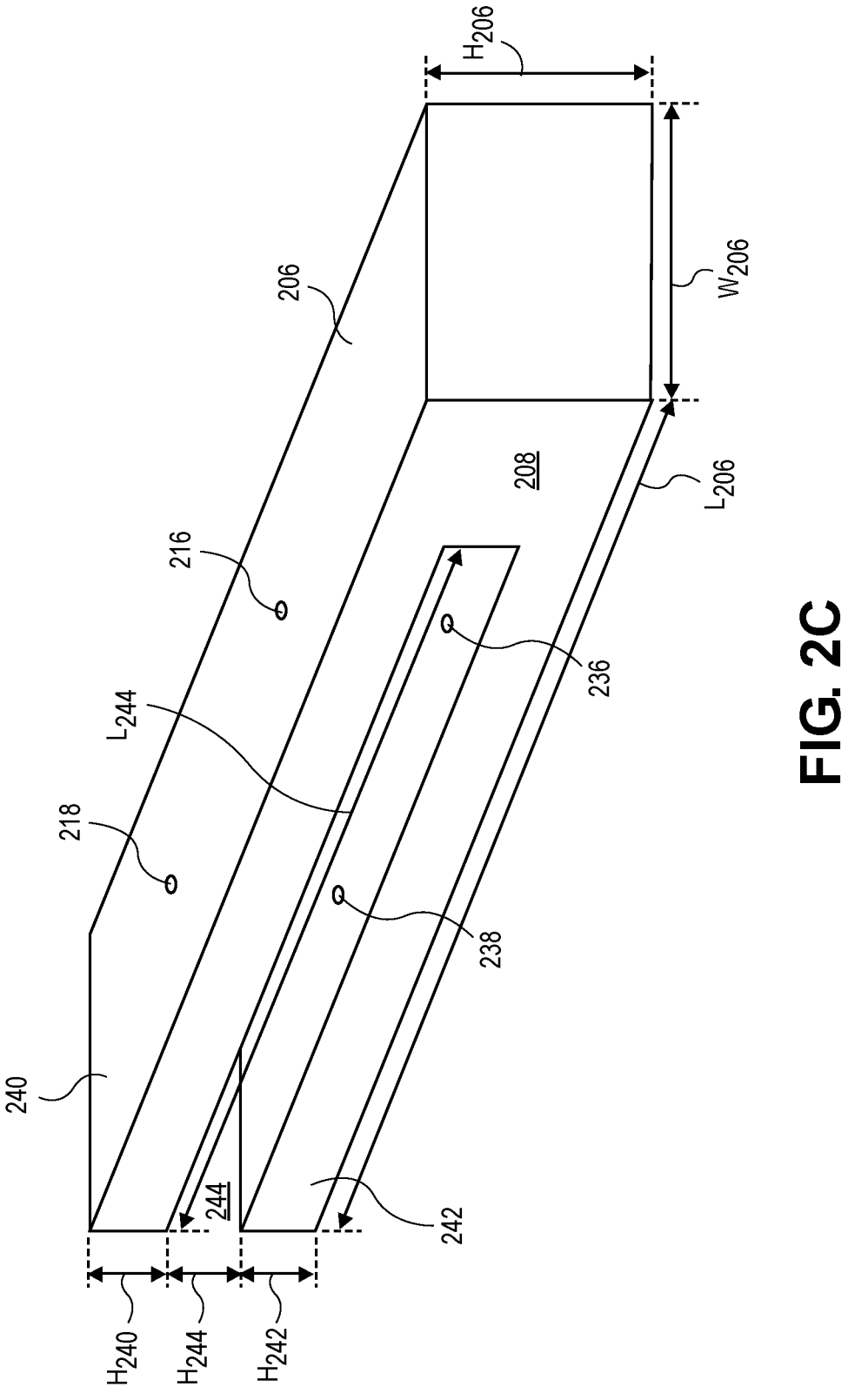
FIG. 2C shows a second member of the device of FIG. 2A.

FIGS. 2A-2C show device 200 for analysis of combined mechanical and thermal loading of structures, according to some examples of the disclosed apparatuses.

As shown in FIGS. 2A-2C, device 200 for analysis of combined mechanical and thermal loading of structures can comprise: first member 202 comprising first material 204; and second member 206 comprising second material 208. First material 204 can differ from second material 208.

Second member 206 can be at least partially around first member 202. First member 202 can be attached to second member 206 in at least two locations along the length of first member 202 using, for example, fasteners (not shown) commonly employed in the aviation industry (e.g., aerospace fasteners, bolts, or rivets).

Device 200 can be configured to mechanically load first member 202 and second member 206 by applying force to the end of first member 202 that extends beyond second member 206 and, at the same time, by applying equal and opposite force to the end of second member 206 that extends beyond the end of first member 202. For example, such forces can be applied to first member 202 and second member 206 using a universal testing machine, as discussed below.

First material 204 can comprise at least one metal, such as aluminum or aluminum alloy, nickel or nickel alloy, niobium or niobium alloy, magnesium or magnesium alloy, steel or steel alloy, titanium or titanium alloy, tungsten or tungsten alloy, or vanadium or vanadium alloy. As would be understood by a PHOSITA, selection of materials for first material 204 can be tailored to produce various coefficients of thermal expansion for thermal loading.

In addition or in the alternative, first material 204 can comprise an additively manufactured metal part. First material 204 can comprise at least one non-metal, at least one polymer, or a composite laminate. In addition or in the alternative, first material 204 can comprise an additively manufactured polymer part.

Such a composite laminate of first material 204 can comprise reinforcing fibers, such as carbon fibers, glass fibers, or carbon fibers and glass fibers. Such fibers may have no specific orientation (e.g., omnidirectional) or may be oriented in one or more directions (e.g., unidirectional, bidirectional, or multidirectional). The fibers may be aligned, continuous, discontinuous, and/or unidirectional.

The composite laminate can comprise, for example, continuous fibers, short fibers, pre-preg unidirectional tape, pre-preg fabric, a combination of pre-preg tape and fabric layers to create a hybrid laminate, or fabric or unidirectional fibers infused by resin and cured into a laminate. As would be understood by a PHOSITA, selection of materials and/or orientation of layers within such a composite laminate of first material 204 can be tailored to produce various coefficients of thermal expansion for thermal loading.

Second material 208 can comprise at least one metal, such as aluminum or aluminum alloy, nickel or nickel alloy, niobium or niobium alloy, magnesium or magnesium alloy, steel or steel alloy, titanium or titanium alloy, tungsten or tungsten alloy, or vanadium or vanadium alloy. As would be understood by a PHOSITA, selection of materials for second material 208 can be tailored to produce various coefficients of thermal expansion for thermal loading.

In addition or in the alternative, second material 208 can comprise an additively manufactured metal part. Second material 208 can comprise at least one non-metal, at least one polymer, or a composite laminate. In addition or in the alternative, second material 208 can comprise an additively manufactured polymer part.

Such a composite laminate of second material 208 can comprise reinforcing fibers, such as carbon fibers, glass fibers, or carbon fibers and glass fibers. Such fibers may have no specific orientation (e.g., omnidirectional) or may be oriented in one or more directions (e.g., unidirectional, bidirectional, or multidirectional). The fibers may be aligned, continuous, discontinuous, and/or unidirectional.

The composite laminate can comprise, for example, continuous fibers, short fibers, pre-preg unidirectional tape, pre-preg fabric, a combination of pre-preg tape and fabric layers to create a hybrid laminate, or fabric or unidirectional fibers infused by resin and cured into a laminate. As would be understood by a PHOSITA, selection of materials and/or orientation of layers within such a composite laminate of second material 208 can be tailored to produce various coefficients of thermal expansion for thermal loading.

In a first example, first material 204 can comprise at least one metal, such as tungsten or tungsten alloy, and second material 208 can comprise a hybrid laminate. In a second example, first material 204 can comprise a composite laminate comprising carbon fibers and glass fibers, and second material 208 can comprise at least one metal, such as steel or steel alloy.

Because first member 202 comprises first material 204, first member 202 has a first coefficient of thermal expansion. Because second member 206 comprises second material 208, second member 206 has a second coefficient of thermal expansion.

For analysis of combined mechanical and thermal loading of structures, it is desired that the first coefficient of thermal expansion differ from the second coefficient of thermal expansion. Under some testing conditions, the first coefficient of thermal expansion can be greater than the second coefficient of thermal expansion, while under other testing conditions, the first coefficient of thermal expansion can be less than the second coefficient of thermal expansion.

As shown in FIGS. 2A and 2B, in order to simplify calculations, estimates, measurements, and other issues associated with analysis of combined mechanical and thermal loading of structures, first member 202 can comprise a substantially flat, rectangular plate having length $L_{202}$, width $W_{202}$, and height $H_{202}$. Example values include: length $L_{202}$ (e.g., 5"-100", 7.5"-50", or 10"-25"-such as 6.5", 9.5", 10", 11.5", 13.5", 14.5", 15", 18.5", 20", 23.5", or 24.5"); width $W_{202}$ (e.g., 1"-10", 1.5"-5", or 2"-4"-such as 1.5", 2", 2.5", or 3"); and height $H_{202}$ (e.g., 0.05"-0.60", 0.06"-0.30", or 0.075"-0.15"-such as 0.08", 0.09", 0.10", or 0.135").

Although other shapes could be used for first member 202, such as a plate with a circular, triangular, pentagonal, hexagonal, or other cross section (rather than a rectangular cross section) or a plate whose overall shape resembles a circle, ellipse, oval, parallelogram, rhombus, trapezoid, or other figure (rather than a rectangle), a PHOSITA would recognize that such alternate cross sections and/or overall shapes could add complexity to the calculations, estimates, measurements, and other issues associated with the analysis of combined mechanical and thermal loading of structures.

As also shown in FIGS. 2A and 2B, first member 202 can define a 3D coordinate-axis system for device 200 that includes an X-axis along length $L_{202}$, a Y-axis along width $W_{202}$, and a Z-axis along height $H_{202}$ in which the positive directions for the axes follow the right-hand rule. When first member 202 is a substantially flat, rectangular, homogeneous plate, the center of mass of first member 202 should lie on the X-axis.

In order to facilitate fastening first member 202 to second member 206, first member 202 can include through holes 220 and 222. Through holes 220 and 222 should lie along the X-axis and the direction of through holes 220 and 222 should be parallel to the Z-axis. Although a PHOSITA would recognize that other approaches for fastening first member 202 to second member 206 can be used, through holes that are aligned and penetrate first member 202 to second member 206 provide an approach that is simple, efficient, effective, and should provide repeatable testing results.

As shown in FIGS. 2A and 2C, in order to simplify calculations, estimates, measurements, and other issues associated with analysis of combined mechanical and thermal loading of structures, second member 206 can comprise a substantially U-shaped plate having length $L_{206}$, width $W_{206}$, and height $H_{206}$. Example values include: length $L_{206}$ (e.g., 5"-100", 7.5"-50", or 10"-25"-such as 6.5", 9.5", 10", 11.5", 13.5", 14.5", 15", 18.5", 20", 23.5", or 24.5"); length $L_{244}$ (e.g., 4"-75", 5"-50", or 6"-25"-such as 5", 6", 8", 10", 12.5", 15", 17.5", or 20"); width $W_{206}$ (e.g., 1"-10", 1.5"-5", or 2"-4"-such as 1.5", 2", 2.5", or 3"); height $H_{206}$ (e.g., 0.15"-1.80", 0.18"-0.90", or 0.225"-0.45"-such as 0.24", 0.27", 0.30", or 0.405"); height $H_{240}$ (e.g., 0.05"-0.60", 0.06"-0.30", or 0.075"-0.15"-such as 0.08", 0.09", 0.10", or 0.135"); height $H_{242}$ (e.g., 0.05"-0.60", 0.06"-0.30", or 0.075"-0.15"-such as 0.08", 0.09", 0.10", or 0.135"); and height $H_{244}$ (e.g., 0.05"-0.60", 0.06"-0.30", or 0.075"-0.15"-such as 0.08", 0.09", 0.10", or 0.135").

As also shown in FIGS. 2A and 2C, second member 206 can comprise upper portion 240 having height $H_{240}$, lower portion 242 having height $H_{242}$, and gap 244 having length $L_{244}$ and height $H_{244}$.

As shown in FIG. 2A, when assembling device 200, first member 202 can be substantially aligned with second member 206 along the X-axis.

In order to facilitate fastening second member 206 to first member 202, upper portion 240 of second member 206 can include through holes 216 and 218 and lower portion 242 of second member 206 can include through holes 236 and 238. When assembling device 200, through holes 216, 218, 236, and 238 should lie along the X-axis and the direction of through holes 216, 218, 236, and 238 should be parallel to the Z-axis. Although a PHOSITA would recognize that other approaches for fastening second member 206 to first member 202 can be used, through holes that are aligned and penetrate first member 202 and second member 206 provide an approach that is simple, efficient, effective, and should provide repeatable testing results.

In order to simplify calculations, estimates, measurements, and other issues associated with analysis of combined mechanical and thermal loading of structures, when first member 202 and second member 206 are mechanically loaded, the mechanical load on upper portion 240 of second member 206 from first member 202 should be equal to the mechanical load on lower portion 242 of second member 206 from first member 202, so that the net mechanical load is applied along the X-axis. Because of this net mechanical loading along the X-axis, first member 202 should not have a tendency to bend, curl, or twist, and should not have a tendency to move along the Y-axis, to move along the Z-axis, to roll with respect to the X-axis, to pitch with respect to the Y-axis, or to yaw with respect to the Z-axis. Similarly, because of this net mechanical loading along the X-axis, second member 206 should not have a tendency to bend, curl, or twist, and should not have a tendency to move along the Y-axis, to move along the Z-axis, to roll with respect to the X-axis, to pitch with respect to the Y-axis, or to yaw with respect to the Z-axis.

When first member 202 and second member 206 are mechanically loaded, a distance in the X-axis direction between fasteners joining first member 202 and second member 206 can increase.

Device 200 can be configured to apply force to first member 202 at through hole 234 (e.g., the protruding end of first member 202) while holding the opposite end of second member 206 (e.g., the protruding end of second member 206).

A first load path is through first member 202, between through hole 234 and through hole 222, through a fastener in through hole 222 in first member 202 and through hole 218 in upper portion 240 of second member 206, and through second member 206 between through hole 218 and the protruding end of second member 206. A second load path is through first member 202, between through hole 234 and through hole 220, through a fastener in through hole 220 in first member 202 and through hole 216 in upper portion 240 of second member 206, and through second member 206 between through hole 216 and the protruding end of second member 206. A third load path is through first member 202, between through hole 234 and through hole 222, through a fastener in through hole 222 in first member 202 and through hole 238 in lower portion 242 of second member 206, and through second member 206 between through hole 238 and the protruding end of second member 206. A fourth load path is through first member 202, between through hole 234 and through hole 220, through a fastener in through hole 220 in first member 202 and through hole 236 in lower portion 242 of second member 206, and through second member 206 between through hole 236 and the protruding end of second member 206.

As discussed above, first member 202 can comprise a first plate, upper portion 240 of second member 206 can comprise a second plate, and lower portion 242 of second member 206 can comprise a third plate. One or more plates of the first, second, and third plates can comprise a substantially flat, rectangular plate. As discussed above, a PHOSITA would recognize that alternate cross sections and/or overall shapes, although useable, could add complexity to the calculations, estimates, measurements, and other issues associated with the analysis of combined mechanical and thermal loading of structures.

The second and third plates can lie in parallel geometric planes. The first, second, and third plates can lie in parallel geometric planes.

FIGS. 3A-3D show device 300 for analysis of combined mechanical and thermal loading of structures, according to some examples of the disclosed apparatuses.

As shown in FIGS. 3A-3D, device 300 for analysis of combined mechanical and thermal loading of structures can comprise: first member 302 comprising first material 304; second member 306 comprising second material 308; and third member 310 comprising first material 304. First material 304 can differ from second material 308.

Second member 306 can be at least partially between first member 302 and third member 310. Second member 306 can be attached to first member 302 and third member 310 in at least two locations along the length of second member 306 using, for example, fasteners (not shown) commonly employed in the aviation industry (e.g., aerospace fasteners, bolts, or rivets).

Device 300 can be configured to mechanically load first member 302, second member 306, and third member 310 by applying force to a first end of second member 306 that extends beyond the ends of first member 302 and third member 310 and, at the same time, by applying equal and opposite force to a second end of second member 306 that extends beyond the ends of first member 302 and third member 310. For example, such forces can be applied to second member 306 using a universal testing machine, as discussed below.

First material 304 can comprise at least one metal, such as aluminum or aluminum alloy, nickel or nickel alloy, niobium or niobium alloy, magnesium or magnesium alloy, steel or steel alloy, titanium or titanium alloy, tungsten or tungsten alloy, or vanadium or vanadium alloy. As would be understood by a PHOSITA, selection of materials for first material

304 can be tailored to produce various coefficients of thermal expansion for thermal loading.

In addition or in the alternative, first material 304 can comprise an additively manufactured metal part. First material 304 can comprise at least one non-metal, at least one polymer, or a composite laminate. In addition or in the alternative, first material 304 can comprise an additively manufactured polymer part.

Such a composite laminate of first material 304 can comprise reinforcing fibers, such as carbon fibers, glass fibers, or carbon fibers and glass fibers. Such fibers may have no specific orientation (e.g., omnidirectional) or may be oriented in one or more directions (e.g., unidirectional, bidirectional, or multidirectional). The fibers may be aligned, continuous, discontinuous, and/or unidirectional.

The composite laminate can comprise, for example, continuous fibers, short fibers, pre-preg unidirectional tape, pre-preg fabric, a combination of pre-preg tape and fabric layers to create a hybrid laminate, or fabric or unidirectional fibers infused by resin and cured into a laminate. As would be understood by a PHOSITA, selection of materials and/or orientation of layers within such a composite laminate of first material 304 can be tailored to produce various coefficients of thermal expansion for thermal loading.

Second material 308 can comprise at least one metal, such as aluminum or aluminum alloy, nickel or nickel alloy, niobium or niobium alloy, magnesium or magnesium alloy, steel or steel alloy, titanium or titanium alloy, tungsten or tungsten alloy, or vanadium or vanadium alloy. As would be understood by a PHOSITA, selection of materials for second material 308 can be tailored to produce various coefficients of thermal expansion for thermal loading.

In addition or in the alternative, second material 308 can comprise an additively manufactured metal part. Second material 308 can comprise at least one non-metal, at least one polymer, or a composite laminate. In addition or in the alternative, second material 308 can comprise an additively manufactured polymer part.

Such a composite laminate of second material 308 can comprise reinforcing fibers, such as carbon fibers, glass fibers, or carbon fibers and glass fibers. Such fibers may have no specific orientation (e.g., omnidirectional) or may be oriented in one or more directions (e.g., unidirectional, bidirectional, or multidirectional). The fibers may be aligned, continuous, discontinuous, and/or unidirectional.

The composite laminate can comprise, for example, continuous fibers, short fibers, pre-preg unidirectional tape, pre-preg fabric, a combination of pre-preg tape and fabric layers to create a hybrid laminate, or fabric or unidirectional fibers infused by resin and cured into a laminate. As would be understood by a PHOSITA, selection of materials and/or orientation of layers within such a composite laminate of second material 308 can be tailored to produce various coefficients of thermal expansion for thermal loading.

In a first example, first material 304 can comprise at least one metal, such as nickel or nickel alloy, and second material 308 can comprise at least one polymer. In a second example, first material 304 can comprise at least one non-metal, and second material 308 can comprise an additively manufactured metal part.

Because first member 302 and third member 310 comprise first material 304, first member 302 and third member 310 have a first coefficient of thermal expansion. Because second member 306 comprises second material 308, second member 306 has a second coefficient of thermal expansion.

For analysis of combined mechanical and thermal loading of structures, it is desired that the first coefficient of thermal expansion differ from the second coefficient of thermal expansion. Under some testing conditions, the first coefficient of thermal expansion can be greater than the second coefficient of thermal expansion, while under other testing conditions, the first coefficient of thermal expansion can be less than the second coefficient of thermal expansion.

Figure 3A:
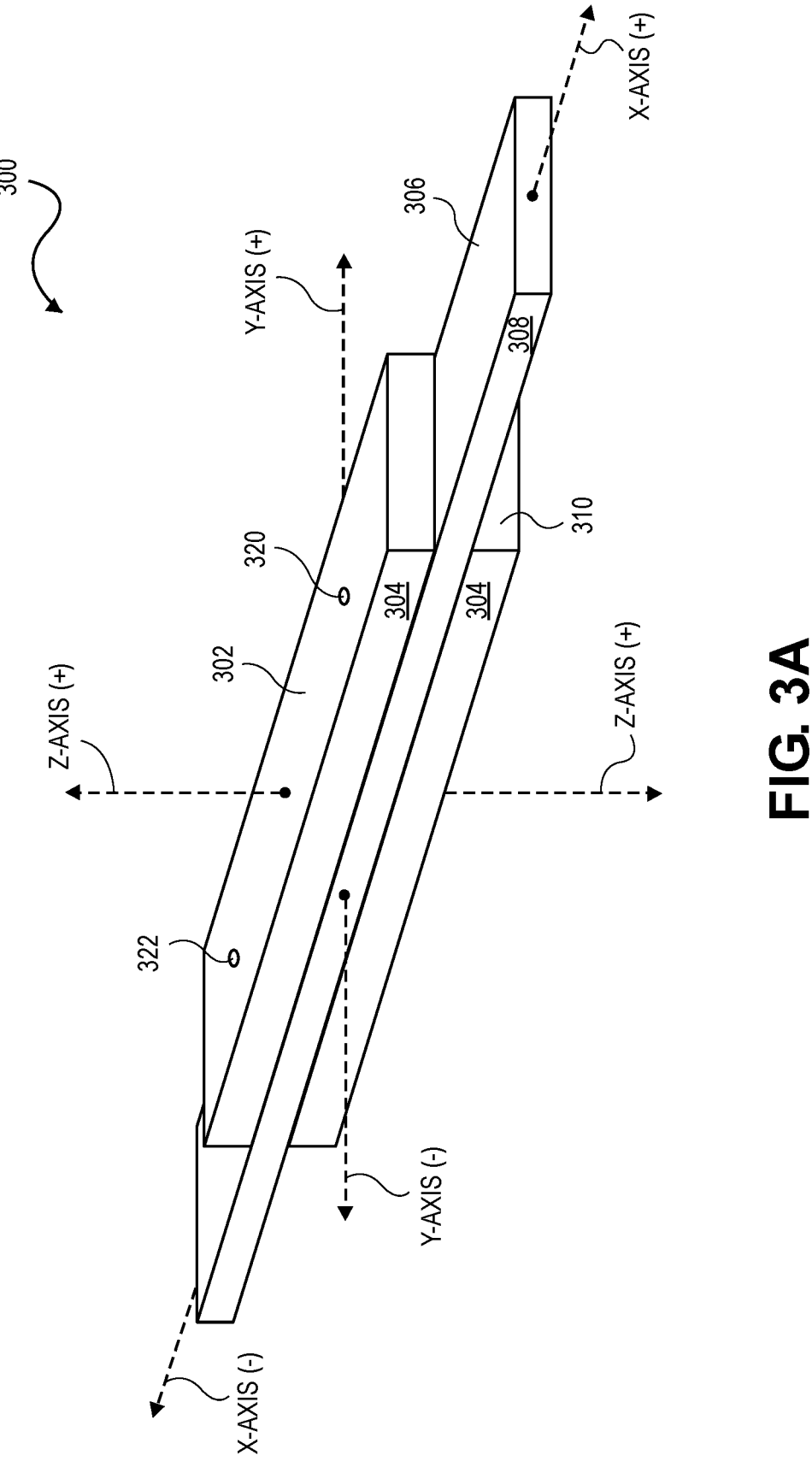
FIG. 3A shows a device for analysis of combined mechanical and thermal loading of structures according to some examples of the disclosed apparatuses.
Figure 3B:
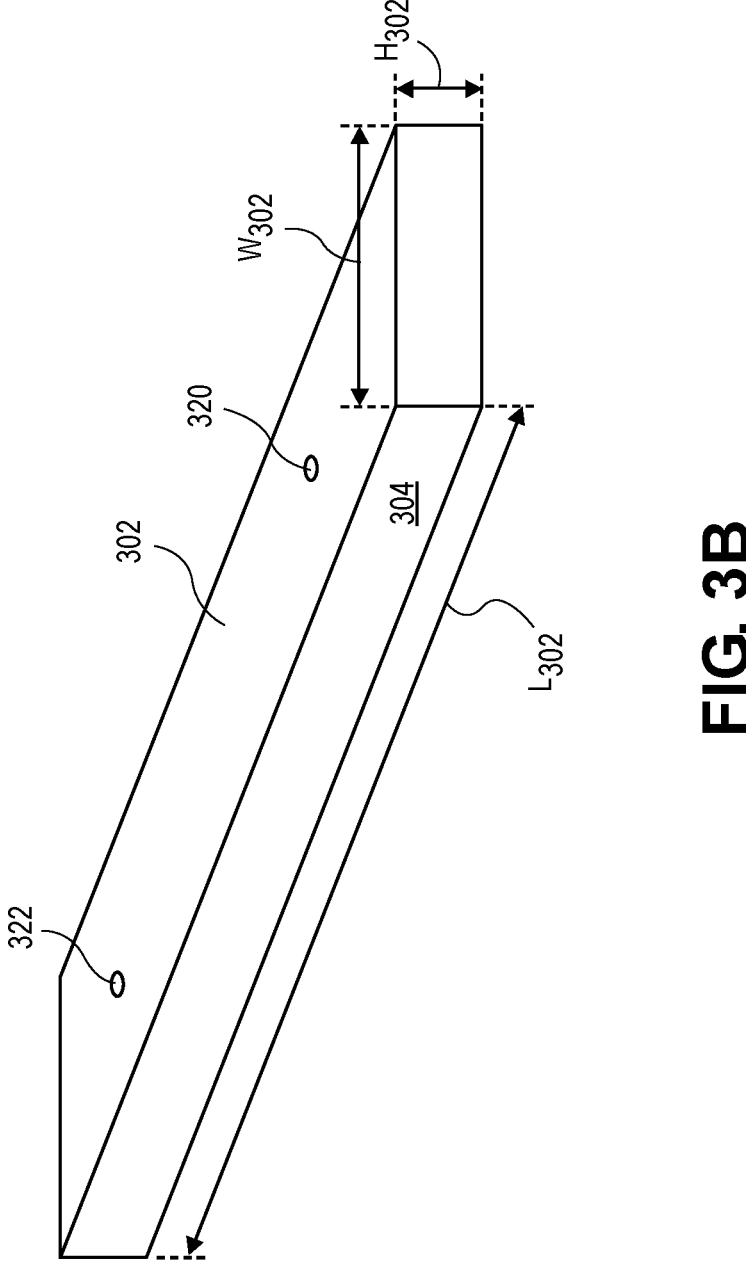
FIG. 3B shows a first member of the device of FIG. 3A.
Figure 3C:
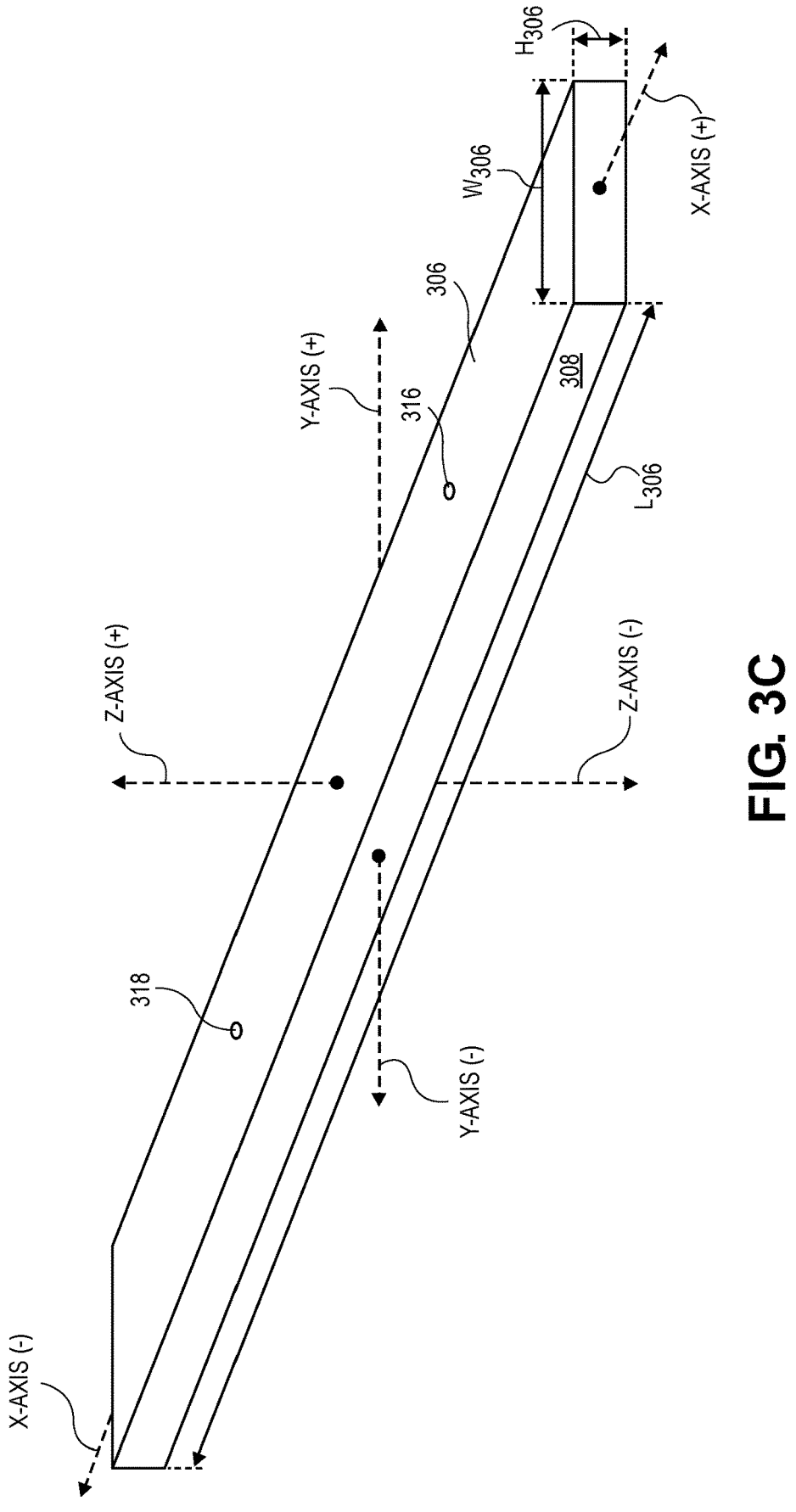
FIG. 3C shows a second member of the device of FIG. 3A.

As shown in FIGS. 3A and 3C, in order to simplify calculations, estimates, measurements, and other issues associated with analysis of combined mechanical and thermal loading of structures, second member 306 can comprise a substantially flat, rectangular plate having length $L_{306}$, width $W_{306}$, and height $H_{306}$. Example values include: length $L_{306}$ (e.g., 5"-100", 7.5"-50", or 10"-25"-such as 6.5", 9.5", 10", 11.5", 13.5", 14.5", 15", 18.5", 20", 23.5", or 24.5"); width $W_{306}$ (e.g., 1"-10", 1.5"-5", or 2"-4"-such as 1.5", 2", 2.5", or 3"); and height $H_{306}$ (e.g., 0.05"-0.60", 0.06"-0.30", or 0.075"-0.15"-such as 0.08", 0.09", 0.10", or 0.135").

Although other shapes could be used for second member 306, such as a plate with a circular, triangular, pentagonal, hexagonal, or other cross section (rather than a rectangular cross section) or a plate whose overall shape resembles a circle, ellipse, oval, parallelogram, rhombus, trapezoid, or other figure (rather than a rectangle), a PHOSITA would recognize that such alternate cross sections and/or overall shapes could add complexity to the calculations, estimates, measurements, and other issues associated with the analysis of combined mechanical and thermal loading of structures.

As also shown in FIGS. 3A and 3C, second member 306 can define a 3D coordinate-axis system for device 300 that includes an X-axis along length $L_{306}$, a Y-axis along width $W_{306}$, and a Z-axis along height $H_{306}$ in which the positive directions for the axes follow the right-hand rule. When second member 306 is a substantially flat, rectangular, homogeneous plate, the center of mass of second member 306 should lie on the X-axis.

In order to facilitate fastening second member 306 to first member 302 and third member 310, second member 306 can include through holes 316 and 318. Through holes 316 and 318 should lie along the X-axis and the direction of through holes 316 and 318 should be parallel to the Z-axis. Although a PHOSITA would recognize that other approaches for fastening second member 306 to first member 302 and third member 310 can be used, through holes that are aligned and penetrate first member 302, second member 306, and third member 310 provide an approach that is simple, efficient, effective, and should provide repeatable testing results.

In order to simplify calculations, estimates, measurements, and other issues associated with analysis of combined mechanical and thermal loading of structures, when first member 302 and third member 310 are mechanically loaded by second member 306, the mechanical load on first member 302 from second member 306 should be equal to the mechanical load on third member 310 from second member 306, so that the net mechanical load is applied along the X-axis. Because of this net mechanical loading along the X-axis, first member 302 and third member 310 should not have a tendency to bend, curl, or twist, and should not have a tendency to move along the Y-axis, to move along the Z-axis, to roll with respect to the X-axis, to pitch with respect to the Y-axis, or to yaw with respect to the Z-axis. As shown in FIG. 3A, this paragraph applies to both ends of device 300.

As shown in FIGS. 3A and 3B, in order to simplify calculations, estimates, measurements, and other issues associated with analysis of combined mechanical and thermal loading of structures, first member 302 can comprise a substantially flat, rectangular plate having length $L_{302}$, width $W_{302}$, and height $H_{302}$. Example values include: length $L_{302}$ (e.g., 5"-100", 7.5"-50", or 10"-25"-such as 6.5", 9.5", 10", 11.5", 13.5", 14.5", 15", 18.5", 20", 23.5", or 24.5"); width $W_{302}$ (e.g., 1"-10", 1.5"-5", or 2"-4"-such as 1.5", 2", 2.5", or 3"); and height $H_{302}$ (e.g., 0.05"-0.60", 0.06"-0.30", or 0.075"-0.15"-such as 0.08", 0.09", 0.10", or 0.135").

Although other shapes could be used for first member 302, such as a plate with a circular, triangular, pentagonal, hexagonal, or other cross section (rather than a rectangular cross section) or a plate whose overall shape resembles a circle, ellipse, oval, parallelogram, rhombus, trapezoid, or other figure (rather than a rectangle), a PHOSITA would recognize that such alternate cross sections and/or overall shapes could add complexity to the calculations, estimates, measurements, and other issues associated with the analysis of combined mechanical and thermal loading of structures.

As shown in FIG. 3A, when assembling device 300, first member 302 can be substantially aligned with second member 306 along the X-axis.

In order to facilitate fastening second member 306 to first member 302, first member 302 can include through holes 320 and 322. When assembling device 300, through holes 320 and 322 should lie along the X-axis and the direction of through holes 320 and 322 should be parallel to the Z-axis. Although a PHOSITA would recognize that other approaches for fastening second member 306 to first member 302 can be used, through holes that are aligned and penetrate first member 302, second member 306, and third member 310 provide an approach that is simple, efficient, effective, and should provide repeatable testing results.

Figure 3D:
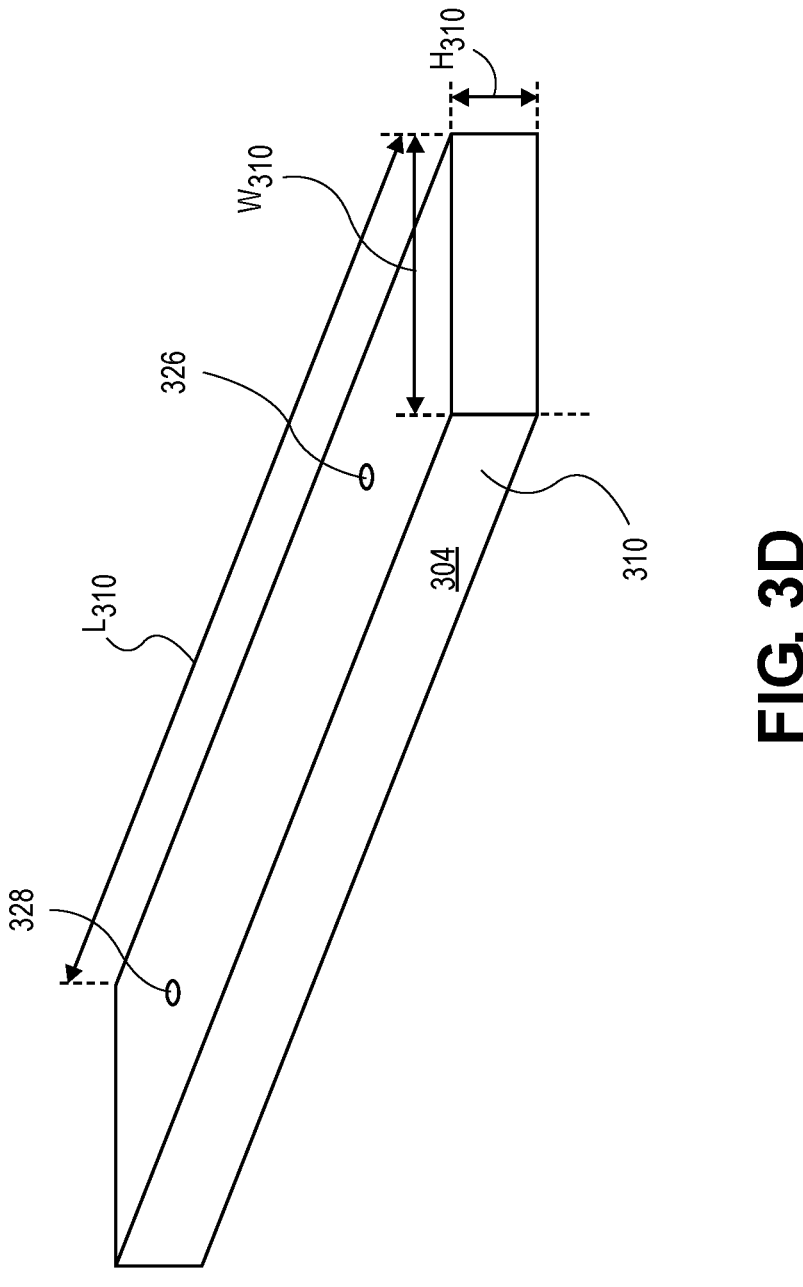
FIG. 3D shows a third member of the device of FIG. 3A.

As shown in FIGS. 3A and 3D, in order to simplify calculations, estimates, measurements, and other issues associated with analysis of combined mechanical and thermal loading of structures, third member 310 can comprise a substantially flat, rectangular plate having length $L_{310}$, width $W_{310}$, and height $H_{310}$. Third member 310 can be, for example, thickened at one end for increased strength. Example values include: length $L_{310}$ (e.g., 5"-100", 7.5"-50", or 10"-25"-such as 6.5", 9.5", 10", 11.5", 13.5", 14.5", 15", 18.5", 20", 23.5", or 24.5"); width $W_{310}$ (e.g., 1"-10", 1.5"-5", or 2"-4"-such as 1.5", 2", 2.5", or 3"); and height $H_{310}$ (e.g., 0.05"-0.60", 0.06"-0.30", or 0.075"-0.15"-such as 0.08", 0.09", 0.10", or 0.135").

Although other shapes could be used for third member 310, such as a plate with a circular, triangular, pentagonal, hexagonal, or other cross section (rather than a rectangular cross section) or a plate whose overall shape resembles a circle, ellipse, oval, parallelogram, rhombus, trapezoid, or other figure (rather than a rectangle), a PHOSITA would recognize that such alternate cross sections and/or overall shapes could add complexity to the calculations, estimates, measurements, and other issues associated with the analysis of combined mechanical and thermal loading of structures.

As shown in FIG. 3A, when assembling device 300, third member 310 can be substantially aligned with second member 306 along the X-axis.

In order to facilitate fastening second member 306 to third member 310, third member 310 can include through holes 326 and 328. When assembling device 300, through holes 326 and 328 should lie along the X-axis and the direction of through holes 326 and 328 should be parallel to the Z-axis. Although a PHOSITA would recognize that other approaches for fastening second member 306 to third member 310 can be used, through holes that are aligned and penetrate first member 302, second member 306, and third member 310 provide an approach that is simple, efficient, effective, and should provide repeatable testing results.

When first member 302 and third member 310 are mechanically loaded by second member 306, a distance in the X-axis direction between fasteners joining first member 302 and third member 310 to second member 306 can increase.

Device 300 can be configured to apply force to both ends of second member 306 (e.g., a first protruding end of second member 306 and a second protruding end of second member 306). A first load path is through the first protruding end of second member 306 (e.g., clamped or fastened to a universal testing machine), through second member 306, and to the second protruding end of second member 306 (e.g., also clamped or fastened to the universal testing machine). A second load path is through the first protruding end of second member 306 (e.g., clamped or fastened to the universal testing machine), through a first fastener in through hole 322 in first member 302 and through hole 318 in second member 306, through first member 302, through a second fastener in through hole 320 in first member 302 and through hole 316 in second member 306, and to the second protruding end of second member 306 (e.g., also clamped or fastened to the universal testing machine). A third load path is through the first protruding end of second member 306 (e.g., clamped or fastened to the universal testing machine), through the first fastener in through hole 328 in third member 310 and through hole 318 in second member 306, through third member 310, through the second fastener in through hole 326 in third member 310 and through hole 316 in second member 306, and to the second protruding end of second member 306 (e.g., also clamped or fastened to the universal testing machine).

As discussed above, first member 302 can comprise a first plate, second member 306 can comprise a second plate, and third member 310 can comprise a third plate. One or more plates of the first, second, and third plates can comprise a substantially flat, rectangular plate. As discussed above, a PHOSITA would recognize that alternate cross sections and/or overall shapes, although useable, could add complexity to the calculations, estimates, measurements, and other issues associated with the analysis of combined mechanical and thermal loading of structures.

The first and third plates can lie in parallel geometric planes. The first, second, and third plates can lie in parallel geometric planes.

As shown in FIGS. 1A-1D, device 100 can comprise a double-pin thermo-mechanical ("DPTM") test joint; as shown in FIGS. 2A-2C, device 200 can comprise a DPTM test joint; and as shown in FIGS. 3A-3D, device 300 can comprise a DPTM test joint.

By careful selection of physical parameters, DPTM test joint 100, 200, 300 can emulate or replicate actual structures used, for example, in the construction of aircraft. For example, first member 102, second member 106, and third member 110 can emulate or replicate an actual structure to be used in a particular aircraft, incorporating for the respective members the same materials, the same dimensions, the same relative locations, the same fasteners (e.g., the same fastener diameters) (e.g., ¼" or ½" diameter Inconel fasteners), the same fastener-to-fastener spacing (e.g., 1"-60", 2"-30", or 5"-15"—such as 5", 10", 15", 25", or 50"), etc.

In DPTM test joint 100, for example, if first member 102 and third member 110 are aluminum plates and second member 106 is a composite laminate, then under cold-loading conditions, first member 102 and third member 110 will attempt to contract equally due to their matching, relatively high values for the coefficient of thermal expansion ("CTE"), while second member 106 will attempt to contract less due to its relatively low value for CTE. The fasteners used to join first member 102 to second member 106 and third member 110 to second member 106 will then constrain the contraction, putting first member 102 and third member 110 in tension, while putting second member 106 in compression. Adding mechanical tension load to the joint increases the tensile load in first member 102 and in third member 110, and if the tensile load becomes too high, DPTM test joint 100 is designed to fail across the fastener region in either first member 102 or third member 110. As would be understood by a PHOSITA, the initial thermal load can be measured during testing or can be found using theory.

DPTM test joint 100, 200, 300 can be gripped, loaded, and tested using standard testing machines known to a PHOSITA, such as High Force Universal Testing Machines made by Instron.® For testing at stable, non-ambient temperatures, the desired temperature (e.g., −100° F. to +100° F., −80° F. to +80° F., or −70° F. to +70° F.—such as −65° F. or +70° F.) can be imposed directly to one or more portions of DPTM test joint 100, 200, 300 (e.g., directly to first member 102, second member 106, and/or third member 110). In a first alternative, a testing machine can be equipped with a furnace configured to achieve stable, non-ambient temperatures. In a second alternative, the testing machine can be located in a chamber in which DPTM test joint 100, 200, 300 can be subjected to stable, non-ambient temperatures. In a third alternative, DPTM test joint 100, 200, 300 can be heated or cooled to a stable, non-ambient temperature prior to installing DPTM test joint 100, 200, 300 into the testing machine.

At least one physical parameter of DPTM test joint 100, 200, 300 (e.g., first member 102 and/or third member 110) related to stress analysis can be incorporated into DPTM test joint 100, 200, 300 (e.g., height, length, and width of respective members) or measured (e.g., temperature of respective members, failure load). Such physical parameters can include, for example, height, length, and width; fastener diameter; fastener-to-fastener spacing; load; relative location of respective members; strain; and temperature.

As would be understood by a PHOSITA, high quality testing machines typically include measurement devices. Other measurement devices that can be used include, for example, extensometers (contact or non-contact), infrared sensors, lasers, load cells, piezoelectric sensors, resistive temperature devices ("RTDs"), strain gages, thermistors, and thermocouples.

Material tests using DPTM test joint 100, 200, 300 demonstrate that thermally induced stresses are secondary stresses which are relieved as the member undergoes plastic strain. Therefore, prior to ultimate failure, the majority of thermally induced stresses has dissipated and the ultimate load of a thermo-mechanically loaded specimen is approximately equal to that of the same specimen under only mechanical loading. This realization enables a method to correct the predictions of simplified analyses (e.g., linear elastic full-vehicle FEAs) used for structural sizing by considerably reducing the consideration of thermal loads, allowing for new designs to potentially avoid taking a "weight penalty" associated with overestimating the influence of thermal loads on the full vehicle.

DPTM test joint 100, 200, 300 and associated methods enable capturing improved accuracy of thermal loads directly from the full-vehicle FEAs without increasing model complexity (e.g., the DPTM test joint and associated methods provide numerical evidence of what percentage of the thermally induced stress should be dissipated as a member deforms plastically up until ultimate failure). Engineers can implement corrections to the thermally induced loads for the given material system and geometry to obtain an improved estimate of the combined mechanical and thermal loading. This enables improved methods in the design and analysis phases for vehicles and is robust enough to be readily applied to given design changes without excessive re-work or additional person-hours to develop models.

Figure 4:
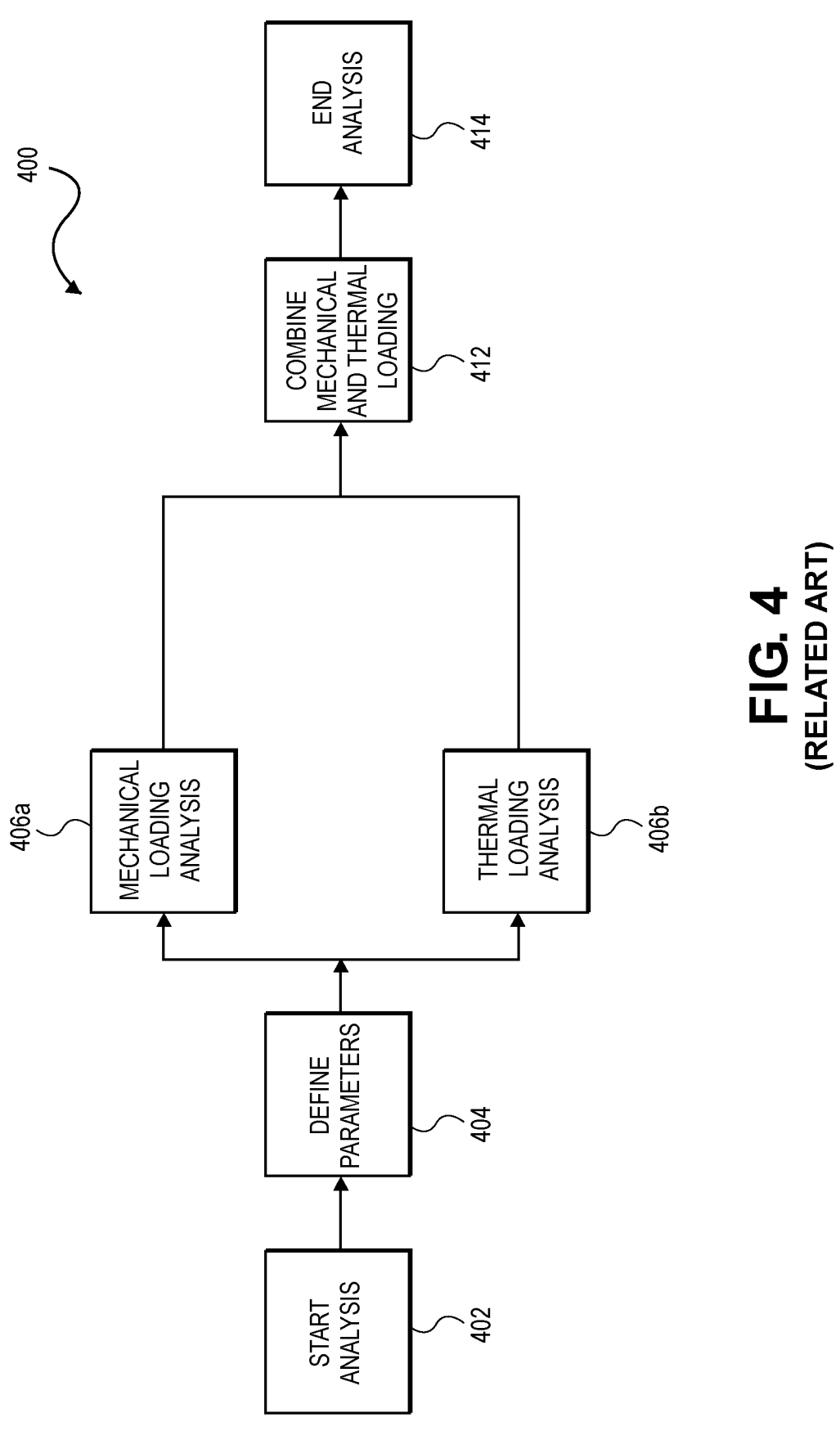
FIG. 4 shows a related art method for analysis of (e.g., determining failure loads for) combined mechanical and thermal loading of structures.

FIG. 4 shows a related art method (400) for analysis of (e.g., determining failure loads for) mechanical and thermal loading of structures.

In FIG. 4, an engineer starts an analysis (402) for the combined mechanical and thermal loading for a full vehicle. Initially, the engineer defines parameters associated with the vehicle (404). Such parameters can include, for example, the configuration of the vehicle, the amount of mechanical loading, and the amount of thermal loading. The engineer then performs a simplified mechanical loading analysis (406a) for the full vehicle, as would be understood by a PHOSITA, and additionally performs a simplified thermal loading analysis (406b) for the full vehicle, as also would be understood by a PHOSITA. Finally, the engineer determines the loading of the vehicle at failure by combining the thermal loading with a proportionally scaled mechanical loading (412) (e.g., combining the results of the thermal loading analysis with a scaled mechanical loading that is increased proportionally until the failure load of a member is reached). This failure load is then compared to the ultimate design load to determine the ultimate margin of safety. If the ultimate margin of safety is either too high or too low, the engineer can make changes to improve the design (e.g., ensuring failure will not occur while minimizing weight, cost, etc.). That would conclude the engineer's analysis (414) for the combined mechanical and thermal loading of the full vehicle.

Because thermal loading is inherently self-limiting, the predicted failure load is necessarily more conservative than the true failure load. Such conservative predictions of failure load effectively require more robust structures, which tends to increase the weight of those structures, resulting in an associated "weight penalty."

Figure 5:
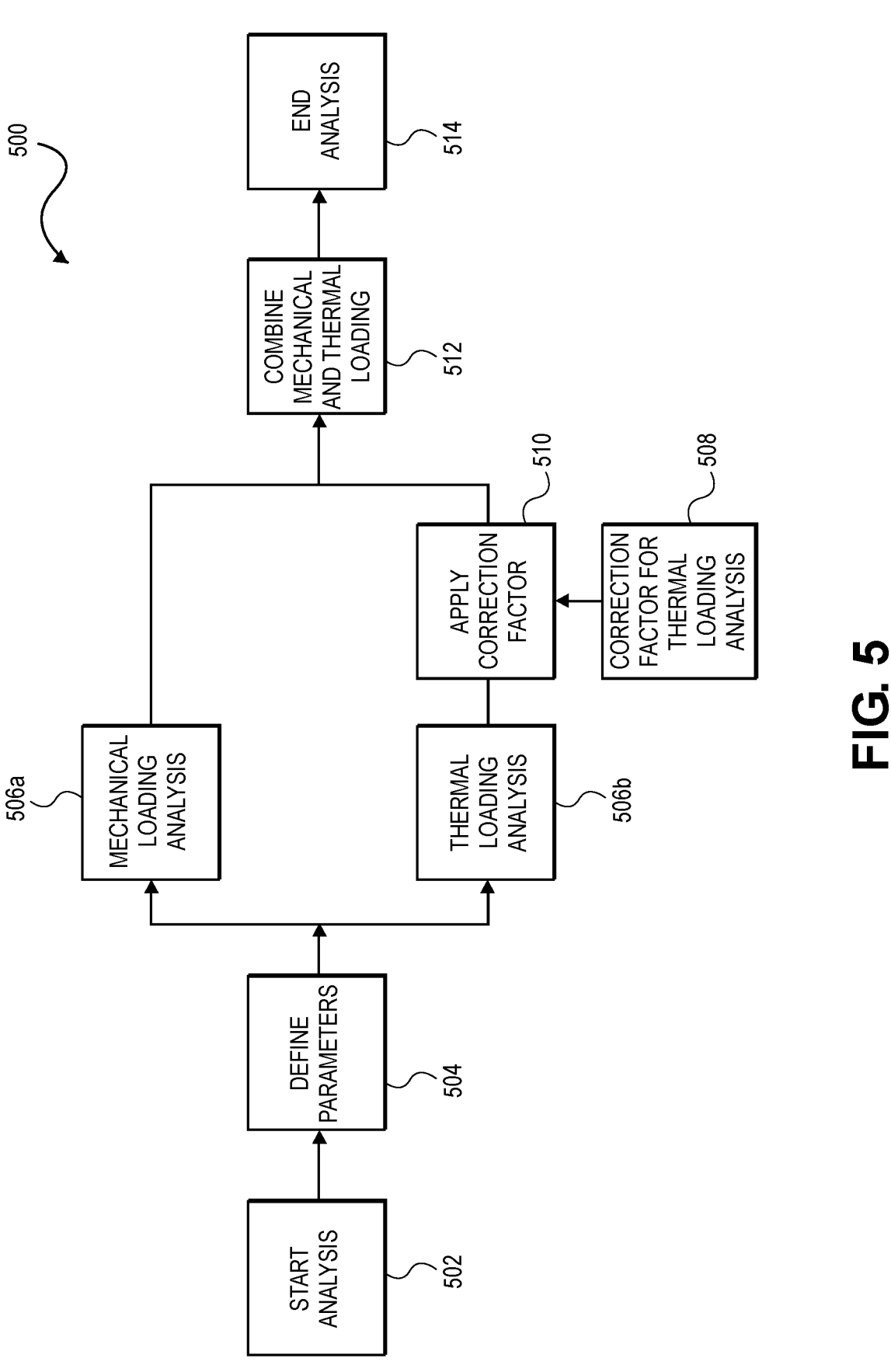
FIG. 5 shows an improved method for analysis of (e.g., determining failure loads for) combined mechanical and thermal loading of structures.

FIG. 5 shows an improved method (500) for analysis of (e.g., determining failure loads for) mechanical and thermal loading of structures.

In FIG. 5, an engineer starts an analysis (502) for the combined mechanical and thermal loading for a full vehicle. Initially, the engineer defines parameters associated with the vehicle (504). Such parameters can include, for example, the configuration of the vehicle, the amount of mechanical loading, and the amount of thermal loading. The engineer then performs a simplified mechanical loading analysis (506a) for the full vehicle, as would be understood by a PHOSITA, and additionally performs a simplified thermal loading analysis (506b) for the full vehicle, as also would be understood by a PHOSITA. Next, the engineer applies a correction factor (510) to the simplified thermal loading analysis based on appropriate DPTM testing (508) to estimate an improved thermal loading. Finally, the engineer determines the loading of the vehicle at failure by combining the improved thermal loading with a proportionally scaled mechanical loading (512) (e.g., combining the results of the corrected thermal loading analysis with a scaled mechanical loading that is increased proportionally until the failure load of a member is reached). This failure load is then compared to the ultimate design load to determine the ultimate margin of safety. If the ultimate margin of safety is either too high or too low, the engineer can make changes to improve the design (e.g., ensuring failure will not occur while minimizing weight, cost, etc.). That would conclude the engineer's analysis (514) for the combined mechanical and thermal loading of the full vehicle.

Because the simplified thermal loading analysis is modified based on DPTM testing, the predicted failure load in the method (500) of FIG. 5 can be much higher than in the related art method (400) of FIG. 4, allowing less conservatism in the design of structures, which tends to decrease the weight of those structures, reducing or eliminating the associated "weight penalty."

Although examples have been shown and described in this specification and figures, it would be appreciated that changes can be made to the illustrated and/or described examples without departing from their principles and spirit, the scope of which is defined by the following claims and their equivalents.

What is claimed is:

1. A device for analysis of mechanical and thermal loading of a double-pin thermo-mechanical structure, the device comprising:

the double-pin thermo-mechanical structure comprising:

a first member comprising a first member protruding end and a first member non-protruding end and comprising first material;

a second member comprising a second member protruding end and a second member non-protruding end and comprising second material; and a third member comprising a third member protruding end and a third member non-protruding end and comprising the first material;

wherein the second member is at least partially between the first member and the third member, wherein the second member is fastened to the first member and the third member by a fastener secured through a first member through hole and a third member through hole, wherein the first material differs from the second material, and wherein the device is configured to mechanically load the first member, the second member, and the third member by applying equal and opposite force to the first member protruding end, the second member protruding end, and the third member protruding end.

2. The device of claim 1, wherein the first material has a first coefficient of thermal expansion, wherein the second material has a second coefficient of thermal expansion, and wherein the first coefficient of thermal expansion differs from the second coefficient of thermal expansion.

3. The device of claim 2, wherein the first coefficient of thermal expansion is greater than the second coefficient of thermal expansion.

4. The device of claim 2, wherein the first coefficient of thermal expansion is less than the second coefficient of thermal expansion.

5. The device of claim 1, wherein the first material comprises at least one metal.

6. The device of claim 1, wherein the first material comprises at least one non-metal.

7. The device of claim 1, wherein the first material comprises a composite laminate.

8. The device of claim 1, wherein the second material comprises at least one metal.

9. The device of claim 1, wherein the second material comprises at least one non-metal.

10. The device of claim 1, wherein the second material comprises at least one composite laminate.

11. A device for analysis of mechanical and thermal loading of a double-pin thermo-mechanical structure, the device comprising:

the double-pin thermo-mechanical structure comprising:

a first member comprising a first member protruding end and a first member non-protruding end and comprising first material; and a second member comprising a second member protruding end and a second member non-protruding end and comprising second material;

wherein the first member is at least partially between portions of the second member, wherein the first member is fastened to the second member, wherein the first material differs from the second material, and wherein the device is configured to mechanically load the first member and the second member by applying equal and opposite force to the first member protruding end and the second member protruding end.

12. The device of claim 11, wherein the first material has a first coefficient of thermal expansion, wherein the second material has a second coefficient of thermal expansion, and wherein the first coefficient of thermal expansion differs from the second coefficient of thermal expansion.

13. The device of claim 12, wherein the first coefficient of thermal expansion is greater than the second coefficient of thermal expansion.

14. The device of claim 12, wherein the first coefficient of thermal expansion is less than the second coefficient of thermal expansion.

15. A method for analysis of mechanical and thermal loading of a double-pin thermo-mechanical structure, the method comprising:

selecting the double-pin thermo-mechanical structure comprising a first member comprising a first member protruding end and a first member non-protruding end, a second member comprising a second member protruding end and a second member non-protruding end, and a third member comprising a third member protruding end and a third member non-protruding end;

fastening the second member to the first member and the third member to form a device for the analysis, wherein the second member is at least partially between the first member and the third member;

thermally loading the device by raising or lowering a temperature of the first member, the second member, and the third member;

mechanically loading the device by applying equal and opposite force to first member protruding end, the second member protruding end, and the third member protruding end; and measuring a failure load or one or more physical parameters of the device;

wherein the first member comprises first material, wherein the second member comprises second material, and wherein the third member comprises the first material.

16. The method of claim 15, further comprising:

determining one or more corrections for a thermal loading analysis based on the measured failure load or the one or more physical parameters of the device.

17. The method of claim 15, further comprising:

determining one or more corrections for a combined mechanical and thermal loading analysis based on the measured failure load or the one or more physical parameters of the device.

18. The method of claim 15, wherein the first material has a first coefficient of thermal expansion, wherein the second material has a second coefficient of thermal expansion, and wherein the first coefficient of thermal expansion differs from the second coefficient of thermal expansion.

19. The method of claim 18, wherein the first coefficient of thermal expansion is greater than the second coefficient of thermal expansion.

20. The method of claim 18, wherein the first coefficient of thermal expansion is less than the second coefficient of thermal expansion.

\*    \*    \*    \*    \*